(12) United States Patent
Liu et al.

(10) Patent No.: US 12,192,141 B2
(45) Date of Patent: Jan. 7, 2025

(54) RESOURCE DETERMINING METHOD AND APPARATUS

(71) Applicant: HUAWEI TECHNOLOGIES CO., LTD., Guangdong (CN)

(72) Inventors: Xianda Liu, Beijing (CN); Kunpeng Liu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 385 days.

(21) Appl. No.: 17/560,681

(22) Filed: Dec. 23, 2021

(65) Prior Publication Data

US 2022/0116180 A1 Apr. 14, 2022

Related U.S. Application Data

(63) Continuation of application No. PCT/CN2020/096199, filed on Jun. 15, 2020.

(30) Foreign Application Priority Data

Jun. 25, 2019 (CN) .......................... 201910557346.4

(51) Int. Cl.
*H04L 5/00* (2006.01)
*H04W 72/0453* (2023.01)

(52) U.S. Cl.
CPC ....... *H04L 5/0051* (2013.01); *H04W 72/0453* (2013.01)

(58) Field of Classification Search
CPC ... H04L 5/0051; H04L 5/0053; H04L 5/0007; H04W 72/0453; H04W 72/0446
See application file for complete search history.

(56) References Cited

U.S. PATENT DOCUMENTS

2014/0247767 A1 9/2014 Chen et al.
2018/0097663 A1 4/2018 Jiang et al.
(Continued)

FOREIGN PATENT DOCUMENTS

CN 102088434 A 6/2011
CN 102395163 A 3/2012
(Continued)

OTHER PUBLICATIONS

Extended European Search Report issued in European Application No. 20833510.9 on Jul. 1, 2022, 7 pages.
(Continued)

*Primary Examiner* — Dady Chery
(74) *Attorney, Agent, or Firm* — Fish & Richardson P.C.

(57) ABSTRACT

The present disclosure relates to resource determining methods and apparatus. One example method includes receiving, by a terminal, N pieces of channel measurement reference signal configuration information, where each of the N pieces of channel measurement reference signal configuration information is used to indicate a time domain resource occupied by a channel measurement reference signal on one carrier, serving cell, or bandwidth part, and N is a positive integer, and determining, by the terminal based on the N pieces of channel measurement reference signal configuration information, an orthogonal frequency division multiplexing (OFDM) symbol occupied by a demodulation reference signal (DMRS) in a first time unit.

20 Claims, 6 Drawing Sheets

(56) References Cited

U.S. PATENT DOCUMENTS

2019/0141703 A1* 5/2019 Gupta .................. H04L 5/0051
2020/0266946 A1* 8/2020 Kim ..................... H04L 27/261

FOREIGN PATENT DOCUMENTS

| CN | 102857458 B | 1/2018 |
|---|---|---|
| EP | 3276849 A1 | 1/2018 |
| WO | 2019089932 A1 | 5/2019 |

OTHER PUBLICATIONS

3GPP TS 38.211 V15.6.0 (Jun. 2019), "3rd Generation Partnership Project; Technical Specification Group Radio Access Network;NR;Physical channels and modulation(Release 15)," Jun. 2019, 97 pages.

Huawei, HiSilicon, "Enhancements on Multi-TRP/panel transmission," 3GPP TSG RAN WG1 Meeting #96bis, R1-1905523, Xi'an, China, Apr. 8-12, 2019, 22 pages.

Office Action issued in Chinese Application No. 201910557346.4 on May 25, 2021, 27 pages (with English translation).

PCT International Search Report and Written Opinion issued in International Application No. PCT/CN2020/096199 on Sep. 21, 2020, 17 pages (with English translation).

Qualcomm Incorporated, "Multi-TRP Enhancements," 3GPP TSG-RAN WG1 Meeting #98bis, R1-1911126, Chongqing, China, Oct. 14-20, 2019, 26 pages.

Qualcomm, "Summary of DMRS Issues," 3GPP TSG RAN WG1 Meeting #94bis, R1-1811838, Chengdu, China, Oct. 8-12, 2018, 23 pages.

* cited by examiner

RESOURCE DETERMINING METHOD AND APPARATUS

CROSS-REFERENCE TO RELATED APPLICATIONS

This application is a continuation of International Application No. PCT/CN2020/096199, filed on Jun. 15, 2020, which claims priority to Chinese Patent Application No. 201910557346.4, filed on Jun. 25, 2019. The disclosures of the aforementioned applications are hereby incorporated by reference in their entireties.

TECHNICAL FIELD

This application relates to the field of communication technologies, and in particular, to a resource determining method and an apparatus.

BACKGROUND

To obtain a higher spectrum utilization rate, a communication system usually uses an intra-frequency networking manner. That is, a plurality of cells in a network may be deployed in a same frequency band. In this way, when a user is at an edge of a serving cell, the user may be subject to co-channel interference from a neighboring cell of the serving cell. Consequently, quality of service and a throughput of the edge user are severely limited. Therefore, to resolve a problem of interference between cells, a coordinated multipoint transmission/reception (CoMP) technology is widely applied. The coordinated multipoint transmission/reception technology specifically means that a plurality of transmission reception points (TRPs) cooperate to transmit data to one terminal, or the plurality of TRPs jointly receive data sent by the terminal. Based on an information exchange delay between the plurality of TRPs, CoMP transmission may be classified into ideal backhaul (IB) and non-ideal backhaul (NIB). In an NIB scenario, because the information exchange delay between the plurality of TRPs is larger, a mechanism of separately delivering downlink control information (DCI) independently by the plurality of TRPs to independently schedule a physical downlink shared channel (PDSCH) and a demodulation reference signal (DMRS) of the terminal is introduced to ensure performance of the communication system.

Currently, in a CoMP transmission scenario, a plurality of TRPs in a coordinated set may each have a configuration in which an LTE base station and an NR base station are co-sited. In this case, cell-specific reference signal (CRS) configuration information is separately configured for each TRP, to indicate a time-frequency resource occupied by a CRS of the TRP. To avoid interference of an LTE CRS to a DMRS corresponding to an NR PDSCH, a DMRS corresponding to a PDSCH independently scheduled by a TRP may be migrated in time domain to avoid an orthogonal frequency division multiplexing (OFDM) symbol occupied by a CRS of the TRP. Because CRS configuration information independently configured for different TRPs is different, DMRSs corresponding to PDSCHs scheduled by the different TRPs are not aligned in time domain. If PDSCHs scheduled by a plurality of TRPs overlap on a time-frequency resource, that DMRSs corresponding to two PDSCHs are not aligned in time domain may cause mutual interference between DMRSs on one PDSCH and the other PDSCH. Consequently, performance of DMRS-based channel estimation of a terminal is affected.

SUMMARY

This application provides a resource determining method and an apparatus, to ensure that DMRSs corresponding to PDSCHs independently scheduled by a plurality of TRPs are aligned in time domain.

According to a first aspect, a resource determining method is provided, and includes: receiving, by a terminal, N pieces of channel measurement reference signal configuration information, where the channel measurement reference signal configuration information is used to indicate a resource occupied by a channel measurement reference signal on one carrier (component carrier, CC)/serving cell/bandwidth part (BWP), the resource occupied by the channel measurement reference signal includes a time domain resource, and N is a positive integer; and determining, by the terminal based on the N pieces of channel measurement reference signal configuration information, an OFDM symbol occupied by a DMRS in a first time unit.

The channel measurement reference signal is a CRS, a channel state information reference signal (CSI-RS), a synchronization signal block (SSB), or a rate matching resource (RMR).

Based on the foregoing technical solution, for any one of a plurality of TRPs participating in coordinated transmission, an OFDM symbol occupied by a DMRS of the TRP in the first time unit is determined based on the N pieces of channel measurement reference signal configuration information, instead of being determined based only on channel measurement reference signal configuration information of the TRP. In other words, for an OFDM symbol occupied by a DMRS of a TRP, impact of channel measurement reference signal configuration information of another TRP is considered, to ensure that the OFDM symbol occupied by the DMRS of the TRP is the same as an OFDM symbol occupied by a DMRS of the another TRP, and performance of DMRS-based channel estimation of the terminal is ensured.

In a possible design, when the channel measurement reference signal configuration information is used to indicate a time-frequency resource occupied by the channel measurement reference signal, the channel measurement reference signal configuration information may include at least one of the following information: a periodicity and an offset in time domain, a quantity and/or positions of OFDM symbols occupied in one slot or subframe, a quantity and/or positions of occupied RBs, a quantity and/or positions of subcarriers occupied in one RB, and a quantity and/or positions of resource elements (REs).

In a possible design, the time-frequency resource occupied by the channel measurement reference signal includes an OFDM symbol, and any OFDM symbol occupied by the DMRS does not overlap any OFDM symbol occupied by channel measurement reference signals and indicated by the N pieces of channel measurement reference signal configuration information, where the OFDM symbol is an OFDM symbol in a specified slot or subframe. In this way, mutual interference between the DMRS and the channel measurement reference signals is avoided.

In a possible design, if an OFDM symbol occupied by a channel measurement reference signal and indicated by at least one of the N pieces of channel measurement reference signal configuration information includes a first OFDM symbol, the OFDM symbol occupied by the DMRS does not include the first OFDM symbol, and the OFDM symbol occupied by the DMRS includes a second OFDM symbol.

In a possible design, if OFDM symbols occupied by the channel measurement reference signals and indicated by the N pieces of channel measurement reference signal configuration information do not include a first OFDM symbol, the OFDM symbol occupied by the DMRS includes the first OFDM symbol, and the OFDM symbol occupied by the DMRS does not include a second OFDM symbol.

In a possible design, the first OFDM symbol and the second OFDM symbol are OFDM symbols other than a start OFDM symbol of a PDSCH corresponding to the DMRS. Specifically, if a quantity of consecutive OFDM symbols occupied by the DMRS is 1, that is, the DMRS is a single-symbol DMRS, the first OFDM symbol and the second OFDM symbol are OFDM symbols other than the first OFDM symbol in a time domain resource of the PDSCH. If a quantity of consecutive OFDM symbols occupied by the DMRS is 2, that is, the DMRS is a double-symbol DMRS, the first OFDM symbol and the second OFDM symbol are OFDM symbols other than the first OFDM symbol and the second OFDM symbol in a time domain resource of the PDSCH.

In a possible design, if a quantity of OFDM symbols occupied by the PDSCH corresponding to the DMRS in one slot or subframe is greater than or equal to 11, the first OFDM symbol and the second OFDM symbol are the last two OFDM symbols in the time domain resource of the PDSCH.

In a possible design, the first time unit is a slot in which the PDSCH corresponding to the DMRS is located, the first OFDM symbol is the twelfth OFDM symbol in the first time unit, and the second OFDM symbol is the thirteenth OFDM symbol in the first time unit.

In a possible design, the first time unit is a slot in which the PDSCH corresponding to the DMRS is located, the first OFDM symbol is the eighth OFDM symbol in the first time unit, and the second OFDM symbol is the ninth OFDM symbol in the first time unit, or the second OFDM symbol is the seventh OFDM symbol in the first time unit.

In a possible design, one or more pieces of channel measurement reference signal configuration information in the N pieces of channel measurement reference signal configuration information are associated with a control resource set, the control resource set is used to carry DCI, and the DCI is used to schedule the PDSCH corresponding to the DMRS; and/or the one or more pieces of channel measurement reference signal configuration information in the N pieces of channel measurement reference signal configuration information are associated with a code division multiplexing (CDM) group occupied by the DMRS.

In a possible design, a resource occupied by a channel measurement reference signal and indicated by the one or more pieces of channel measurement reference signal configuration information includes a plurality of REs, and the PDSCH corresponding to the DMRS is not mapped to the REs occupied by the channel measurement reference signal and indicated by the one or more pieces of channel measurement reference signal configuration information. In this way, mutual interference between the PDSCH and the channel measurement reference signal is avoided.

In a possible design, the resource occupied by the channel measurement reference signal and indicated by the one or more pieces of channel measurement reference signal configuration information includes the plurality of REs, and a position of an RE occupied by the control resource set does not overlap positions of the REs occupied by the channel measurement reference signal and indicated by the one or more pieces of channel measurement reference signal configuration information. In this way, monitoring reliability of the control resource set is improved.

In a possible design, the PDSCH corresponding to the DMRS is not mapped to an RE occupied by a channel measurement reference signal and indicated by channel measurement reference signal configuration information in a first subset; and/or the position of the RE occupied by the control resource set does not overlap a position of an RE occupied by a channel measurement reference signal and indicated by channel measurement reference signal configuration information in a second subset. The first subset includes one or more pieces of channel measurement reference signal configuration information in the N pieces of channel measurement reference signal configuration information. The second subset includes one or more pieces of channel measurement reference signal configuration information in the N pieces of channel measurement reference signal configuration information. It may be understood that the first subset and the second subset may be the same or different.

In a possible design, the method further includes: receiving, by the terminal, first DCI and second DCI, where the first DCI is used to schedule a first PDSCH, the second DCI is used to schedule a second PDSCH, a DMRS on the first PDSCH is a first DMRS, a DMRS on the second PDSCH is a second DMRS, the first DCI is carried in a first control resource set, the second DCI is carried in a second control resource set, and the first control resource set and the second control resource set belong to different control resource set groups; and the determining, by the terminal based on the N pieces of channel measurement reference signal configuration information, an OFDM symbol occupied by a DMRS in a first time unit includes: determining, by the terminal based on the N pieces of channel measurement reference signal configuration information, an OFDM symbol occupied by the first DMRS and an OFDM symbol occupied by the second DMRS in the first time unit.

In a possible design, the method further includes: receiving, by the terminal, first DCI and second DCI, where the first DCI is used to schedule a first PDSCH in the first time unit, the second DCI is used to schedule a second PDSCH in the first time unit, a DMRS on the first PDSCH is a first DMRS, a DMRS on the second PDSCH is a second DMRS, the first DCI is carried in a first control resource set, and the second DCI is carried in a second control resource set; and the determining, by the terminal based on the N pieces of channel measurement reference signal configuration information, an OFDM symbol occupied by a DMRS in a first time unit includes: determining, by the terminal based on the N pieces of channel measurement reference signal configuration information, an OFDM symbol occupied by the first DMRS and an OFDM symbol occupied by the second DMRS in the first time unit.

In a possible design, neither the first DMRS nor the second DMRS occupies the OFDM symbols occupied by the channel measurement reference signals and indicated by the N pieces of channel measurement reference signal configuration information. For example, when at least one of the N pieces of channel measurement reference signal configuration information indicates the twelfth OFDM symbol in a target slot, in the target slot, neither the first DMRS nor the second DMRS occupies the twelfth OFDM symbol in the target slot, but occupies the thirteenth OFDM symbol in the target slot. The target slot may be any slot in time domain. This is not limited.

Specifically, when the N pieces of channel measurement reference signal configuration information include first channel measurement reference signal configuration information and second channel measurement reference signal configuration information, neither the first DMRS nor the second DMRS occupies an OFDM symbol occupied by a channel measurement reference signal and indicated by the first channel measurement reference signal configuration information, and neither the first DMRS nor the second DMRS occupies an OFDM symbol occupied by a channel measurement reference signal and indicated by the second channel measurement reference signal configuration information.

In a possible design, the one or more pieces of channel measurement reference signal configuration information in the N pieces of channel measurement reference signal configuration information are associated with the first control resource set; and/or the one or more pieces of channel measurement reference signal configuration information are associated with a CDM group occupied by the first DMRS. An RE occupied by a channel measurement reference signal and indicated by the one or more pieces of channel measurement reference signal configuration information associated with the first control resource set may be referred to as a first RE for short. An RE occupied by a channel measurement reference signal and indicated by the one or more pieces of channel measurement reference signal configuration information associated with the CDM group occupied by the first DMRS may be referred to as a second RE for short.

In a possible design, the first PDSCH is not mapped to the first RE and/or the second RE. In this way, the terminal may determine, based on a position of the first RE and/or a position of the second RE, a position of an RE for mapping the first PDSCH in a time-frequency resource of the first PDSCH.

In a possible design, the first control resource set does not occupy the first RE and/or the second RE. In other words, a position of an RE occupied by the first control resource set does not overlap the position of the first RE and/or the position of the second RE. In this way, the terminal may determine, based on the position of the first RE and/or the position of the second RE, whether to detect the DCI on the first control resource set. Specifically, if the position of the RE occupied by the first control resource set overlaps the position of the first RE and/or the position of the second RE, the terminal does not detect the first DCI on the first control resource set. If the position of the RE occupied by the first control resource set does not overlap the position of the first RE and/or the position of the second RE, the terminal detects the first DCI on the first control resource set.

In a possible design, the one or more pieces of channel measurement reference signal configuration information in the N pieces of channel measurement reference signal configuration information are associated with the second control resource set; and/or the one or more pieces of channel measurement reference signal configuration information are associated with a CDM group occupied by the second DMRS. An RE occupied by a channel measurement reference signal and indicated by the one or more pieces of channel measurement reference signal configuration information associated with the second control resource set may be referred to as a third RE for short. An RE occupied by a channel measurement reference signal and indicated by the one or more pieces of channel measurement reference signal configuration information associated with the CDM group occupied by the second DMRS may be referred to as a fourth RE for short.

In a possible design, the second PDSCH is not mapped to the third RE and/or the fourth RE. In this way, the terminal may determine, based on a position of the third RE and/or a position of the fourth RE, a position of an RE for mapping the second PDSCH in a time-frequency resource of the second PDSCH.

In a possible design, the second control resource set does not occupy the third RE and/or the fourth RE. In other words, a position of an RE occupied by the second control resource set does not overlap the position of the third RE and/or the position of the fourth RE. In this way, the terminal may determine, based on the position of the third RE and/or the position of the fourth RE, whether to detect the DCI on the second control resource set. Specifically, if the position of the RE occupied by the second control resource set overlaps the position of the third RE and/or the position of the fourth RE, the terminal does not detect the second DCI on the second control resource set. If the position of the RE occupied by the second control resource set does not overlap the position of the third RE and/or the position of the fourth RE, the terminal detects the second DCI on the second control resource set.

The one or more pieces of channel measurement reference signal configuration information associated with the first control resource set are different from the one or more pieces of channel measurement reference signal configuration information associated with the second control resource set. Alternatively, the one or more pieces of channel measurement reference signal configuration information associated with the first control resource set are the same as the one or more pieces of channel measurement reference signal configuration information associated with the second control resource set.

The one or more pieces of channel measurement reference signal configuration information associated with the CDM group occupied by the first DMRS are different from the one or more pieces of channel measurement reference signal configuration information associated with the CDM group occupied by the second DMRS. The one or more pieces of channel measurement reference signal configuration information associated with the CDM group occupied by the first DMRS are the same as the one or more pieces of channel measurement reference signal configuration information associated with the CDM group occupied by the second DMRS.

In a possible design, QCL information of the first PDSCH is different from QCL information of the second PDSCH.

In a possible design, the CDM group occupied by the first DMRS is different from the CDM group occupied by the second DMRS.

In a possible design, a time domain resource occupied by the first PDSCH partially overlaps/completely overlaps a time domain resource occupied by the second PDSCH.

In a possible design, the first PDSCH and the second PDSCH are located in a same BWP/CC.

In a possible design, the first control resource set and the second control resource set are located in a same BWP/CC.

In a possible design, QCL information of the first control resource set is different from QCL information of the second control resource set.

In a possible design, a PUCCH resource set corresponding to the first control resource set is different from a PUCCH resource set corresponding to the second control resource set; or a PUCCH candidate resource pool corresponding to a PUCCH resource selection field in the first DCI is different from a PUCCH candidate resource pool corresponding to a PUCCH resource selection field in the second DCI.

In a possible design, a PDSCH configuration parameter set corresponding to the first control resource set is different from a PDSCH configuration parameter set corresponding to the second control resource set.

In a possible design, the first control resource set and the second control resource set correspond to different candidate hybrid automatic repeat request (HARQ) processes.

In a possible design, time domain positions occupied by the channel measurement reference signals and indicated by all of the N pieces of channel measurement reference signal configuration information are the same, and the time domain position includes a position of a slot and a position of the OFDM symbol occupied by the channel measurement reference signal in the slot. In this way, for a DMRS corresponding to a PDSCH scheduled by any TRP, the terminal may determine, based on one of the N pieces of channel measurement reference signal configuration information, the OFDM symbol occupied by the DMRS in the first time unit.

According to a second aspect, a resource determining method is provided, and includes: obtaining, by a network device, N pieces of channel measurement reference signal configuration information, where the channel measurement reference signal configuration information is used to indicate a resource occupied by a channel measurement reference signal on one carrier/serving cell/bandwidth part, the resource occupied by the channel measurement reference signal includes a time domain resource, and N is a positive integer; and determining, by the network device based on the N pieces of channel measurement reference signal configuration information, an OFDM symbol occupied by a DMRS in a first time unit.

Based on the foregoing technical solution, for any one of a plurality of TRPs participating in coordinated transmission, an OFDM symbol occupied by a DMRS of the TRP in the first time unit is determined based on the N pieces of channel measurement reference signal configuration information, instead of being determined based only on channel measurement reference signal configuration information of the TRP. In other words, for an OFDM symbol occupied by a DMRS of a TRP, impact of channel measurement reference signal configuration information of another TRP is considered, to ensure that the OFDM symbol occupied by the DMRS of the TRP is the same as an OFDM symbol occupied by a DMRS of the another TRP, and performance of DMRS-based channel estimation of a terminal is ensured.

In a possible design, when the channel measurement reference signal configuration information is used to indicate a time-frequency resource occupied by the channel measurement reference signal, the channel measurement reference signal configuration information may include at least one of the following: a periodicity and an offset in time domain, a quantity and/or positions of OFDM symbols occupied in one slot or subframe, a quantity and/or positions of occupied RBs, a quantity and/or positions of subcarriers occupied in one RB, and a quantity and/or positions of REs.

In a possible design, the time-frequency resource of the channel measurement reference signal includes an OFDM symbol, and any OFDM symbol occupied by the DMRS does not overlap any OFDM symbol occupied by channel measurement reference signals and indicated by the N pieces of channel measurement reference signal configuration information, where the OFDM symbol is an OFDM symbol in a specified slot or subframe.

In a possible design, if an OFDM symbol occupied by a channel measurement reference signal and indicated by at least one of the N pieces of channel measurement reference signal configuration information includes a first OFDM symbol, the OFDM symbol occupied by the DMRS does not include the first OFDM symbol, and the OFDM symbol occupied by the DMRS includes a second OFDM symbol.

In a possible design, if OFDM symbols occupied by the channel measurement reference signals and indicated by the N pieces of channel measurement reference signal configuration information do not include a first OFDM symbol, the OFDM symbol occupied by the DMRS includes the first OFDM symbol, and the OFDM symbol occupied by the DMRS does not include a second OFDM symbol.

In a possible design, the first OFDM symbol and the second OFDM symbol are OFDM symbols other than a start OFDM symbol of a PDSCH corresponding to the DMRS. Specifically, if a quantity of consecutive OFDM symbols occupied by the DMRS is 1, that is, the DMRS is a single-symbol DMRS, the first OFDM symbol and the second OFDM symbol are OFDM symbols other than the first OFDM symbol in a time domain resource of the PDSCH. If a quantity of consecutive OFDM symbols occupied by the DMRS is 2, that is, the DMRS is a double-symbol DMRS, the first OFDM symbol and the second OFDM symbol are OFDM symbols other than the first OFDM symbol and the second OFDM symbol in a time domain resource of the PDSCH.

In a possible design, a quantity of OFDM symbols occupied by the PDSCH in one slot or subframe is greater than 11, and the first OFDM symbol and the second OFDM symbol are the last two OFDM symbols in the time domain resource of the PDSCH.

In a possible design, the first time unit is a slot in which the PDSCH corresponding to the DMRS is located, the first OFDM symbol is the twelfth OFDM symbol in the first time unit, and the second OFDM symbol is the thirteenth OFDM symbol in the first time unit.

In a possible design, the first time unit is a slot in which the PDSCH corresponding to the DMRS is located, the first OFDM symbol is the eighth OFDM symbol in the first time unit, and the second OFDM symbol is the ninth OFDM symbol in the first time unit, or the second OFDM symbol is the seventh OFDM symbol in the first time unit.

In a possible design, one or more pieces of channel measurement reference signal configuration information in the N pieces of channel measurement reference signal configuration information are associated with a control resource set, the control resource set is used to carry DCI, and the DCI is used to schedule the PDSCH corresponding to the DMRS; and/or the one or more pieces of channel measurement reference signal configuration information in the N pieces of channel measurement reference signal configuration information are associated with a code division multiplexing (CDM) group occupied by the DMRS.

In a possible design, a resource occupied by a channel measurement reference signal and indicated by the one or more pieces of channel measurement reference signal configuration information includes a plurality of REs, and the PDSCH corresponding to the DMRS is not mapped to the REs occupied by the channel measurement reference signal and indicated by the one or more pieces of channel measurement reference signal configuration information.

In a possible design, the resource occupied by the channel measurement reference signal and indicated by the one or more pieces of channel measurement reference signal configuration information includes the plurality of REs, and a position of an RE occupied by the control resource set does not overlap positions of the REs occupied by the channel measurement reference signal and indicated by the one or more pieces of channel measurement reference signal configuration information.

In a possible design, the PDSCH corresponding to the DMRS is not mapped to an RE occupied by a channel measurement reference signal and indicated by channel measurement reference signal configuration information in a first subset; and/or the position of the RE occupied by the control resource set does not overlap a position of an RE occupied by a channel measurement reference signal and indicated by channel measurement reference signal configuration information in a second subset. The first subset includes one or more pieces of channel measurement reference signal configuration information in the N pieces of channel measurement reference signal configuration information. The second subset includes one or more pieces of channel measurement reference signal configuration information in the N pieces of channel measurement reference signal configuration information. It may be understood that the first subset and the second subset may be the same or different.

In a possible design, time domain positions occupied by the channel measurement reference signals and indicated by all of the N pieces of channel measurement reference signal configuration information are the same, and the time domain position includes a position of a slot and a position of the OFDM symbol occupied by the channel measurement reference signal in the slot.

According to a third aspect, a communication apparatus is provided, and includes: a communication module, for receiving N pieces of channel measurement reference signal configuration information, where the channel measurement reference signal configuration information is used to indicate a resource occupied by a channel measurement reference signal on one carrier/serving cell/bandwidth part, the resource occupied by the channel measurement reference signal includes a time domain resource, and N is a positive integer; and a processing module, for determining, based on the N pieces of channel measurement reference signal configuration information, an OFDM symbol occupied by a DMRS in a first time unit.

In a possible design, when the channel measurement reference signal configuration information is used to indicate a time-frequency resource occupied by the channel measurement reference signal, the channel measurement reference signal configuration information may include at least one of the following: a periodicity and an offset in time domain, a quantity and/or positions of OFDM symbols occupied in one slot or subframe, a quantity and/or positions of occupied RBs, a quantity and/or positions of subcarriers occupied in one RB, and a quantity and/or positions of REs.

In a possible design, the time-frequency resource occupied by the channel measurement reference signal includes an OFDM symbol, and any OFDM symbol occupied by the DMRS does not overlap any OFDM symbol occupied by channel measurement reference signals and indicated by the N pieces of channel measurement reference signal configuration information, where the OFDM symbol is an OFDM symbol in a specified slot or subframe.

In a possible design, if an OFDM symbol occupied by a channel measurement reference signal and indicated by at least one of the N pieces of channel measurement reference signal configuration information includes a first OFDM symbol, the OFDM symbol occupied by the DMRS does not include the first OFDM symbol, and the OFDM symbol occupied by the DMRS includes a second OFDM symbol.

In a possible design, if OFDM symbols occupied by the channel measurement reference signals and indicated by the N pieces of channel measurement reference signal configuration information do not include a first OFDM symbol, the OFDM symbol occupied by the DMRS includes the first OFDM symbol, and the OFDM symbol occupied by the DMRS does not include a second OFDM symbol.

In a possible design, the first OFDM symbol and the second OFDM symbol are OFDM symbols other than a start OFDM symbol of a PDSCH corresponding to the DMRS. Specifically, if a quantity of consecutive OFDM symbols occupied by the DMRS is 1, that is, the DMRS is a single-symbol DMRS, the first OFDM symbol and the second OFDM symbol are OFDM symbols other than the first OFDM symbol in a time domain resource of the PDSCH. If a quantity of consecutive OFDM symbols occupied by the DMRS is 2, that is, the DMRS is a double-symbol DMRS, the first OFDM symbol and the second OFDM symbol are OFDM symbols other than the first OFDM symbol and the second OFDM symbol in a time domain resource of the PDSCH.

In a possible design, a quantity of OFDM symbols occupied by the PDSCH in one slot or subframe is greater than 11, and the first OFDM symbol and the second OFDM symbol are the last two OFDM symbols in the time domain resource of the PDSCH.

In a possible design, the first time unit is a slot in which the PDSCH corresponding to the DMRS is located, the first OFDM symbol is the twelfth OFDM symbol in the first time unit, and the second OFDM symbol is the thirteenth OFDM symbol in the first time unit.

In a possible design, the first time unit is a slot in which the PDSCH corresponding to the DMRS is located, the first OFDM symbol is the eighth OFDM symbol in the first time unit, and the second OFDM symbol is the ninth OFDM symbol in the first time unit, or the second OFDM symbol is the seventh OFDM symbol in the first time unit.

In a possible design, one or more pieces of channel measurement reference signal configuration information in the N pieces of channel measurement reference signal configuration information are associated with a control resource set, the control resource set is used to carry DCI, and the DCI is used to schedule the PDSCH corresponding to the DMRS; and/or the one or more pieces of channel measurement reference signal configuration information in the N pieces of channel measurement reference signal configuration information are associated with a code division multiplexing (CDM) group occupied by the DMRS.

In a possible design, a resource occupied by a channel measurement reference signal and indicated by the one or more pieces of channel measurement reference signal configuration information includes a plurality of REs, and the PDSCH corresponding to the DMRS is not mapped to the REs occupied by the channel measurement reference signal and indicated by the one or more pieces of channel measurement reference signal configuration information.

In a possible design, the resource occupied by the channel measurement reference signal and indicated by the one or more pieces of channel measurement reference signal configuration information includes the plurality of REs, and a position of an RE occupied by the control resource set does not overlap positions of the REs occupied by the channel measurement reference signal and indicated by the one or more pieces of channel measurement reference signal configuration information.

In a possible design, the PDSCH corresponding to the DMRS is not mapped to an RE occupied by a channel measurement reference signal and indicated by channel measurement reference signal configuration information in a first subset; and/or the position of the RE occupied by the control resource set does not overlap a position of an RE occupied by a channel measurement reference signal and indicated by channel measurement reference signal configuration information in a second subset. The first subset includes one or more pieces of channel measurement reference signal configuration information in the N pieces of channel measurement reference signal configuration information. The second subset includes one or more pieces of channel measurement reference signal configuration information in the N pieces of channel measurement reference signal configuration information. It may be understood that the first subset and the second subset may be the same or different.

In a possible design, the communication module is further configured to receive first DCI and second DCI, where the first DCI is used to schedule a first PDSCH, the second DCI is used to schedule a second PDSCH, a DMRS on the first PDSCH is a first DMRS, a DMRS on the second PDSCH is a second DMRS, the first DCI is carried in a first control resource set, the second DCI is carried in a second control resource set, and the first control resource set and the second control resource set belong to different control resource set groups. When determining, based on the N pieces of channel measurement reference signal configuration information, the OFDM symbol occupied by the DMRS in the first time unit, the processing module is configured to determine, based on the N pieces of channel measurement reference signal configuration information, an OFDM symbol occupied by the first DMRS and an OFDM symbol occupied by the second DMRS in the first time unit.

In a possible design, the communication module is further configured to receive first DCI and second DCI, where the first DCI is used to schedule a first PDSCH in the first time unit, the second DCI is used to schedule a second PDSCH in the first time unit, a DMRS on the first PDSCH is a first DMRS, a DMRS on the second PDSCH is a second DMRS, the first DCI is carried in a first control resource set, and the second DCI is carried in a second control resource set. When determining, based on the N pieces of channel measurement reference signal configuration information, the OFDM symbol occupied by the DMRS in the first time unit, the processing module is configured to determine: determining, based on the N pieces of channel measurement reference signal configuration information, an OFDM symbol occupied by the first DMRS and an OFDM symbol occupied by the second DMRS in the first time unit.

In a possible design, neither the first DMRS nor the second DMRS occupies the OFDM symbols occupied by the channel measurement reference signals and indicated by the N pieces of channel measurement reference signal configuration information. For example, when at least one of the N pieces of channel measurement reference signal configuration information indicates the twelfth OFDM symbol in a target slot, in the target slot, neither the first DMRS nor the second DMRS occupies the twelfth OFDM symbol in the target slot, but occupies the thirteenth OFDM symbol in the target slot. The target slot may be any slot in time domain. This is not limited.

Specifically, when the N pieces of channel measurement reference signal configuration information include first channel measurement reference signal configuration information and second channel measurement reference signal configuration information, neither the first DMRS nor the second DMRS occupies an OFDM symbol occupied by a channel measurement reference signal and indicated by the first channel measurement reference signal configuration information, and neither the first DMRS nor the second DMRS occupies an OFDM symbol occupied by a channel measurement reference signal and indicated by the second channel measurement reference signal configuration information.

In a possible design, the one or more pieces of channel measurement reference signal configuration information in the N pieces of channel measurement reference signal configuration information are associated with the first control resource set; and/or the one or more pieces of channel measurement reference signal configuration information are associated with a CDM group occupied by the first DMRS. An RE occupied by a channel measurement reference signal and indicated by the one or more pieces of channel measurement reference signal configuration information associated with the first control resource set may be referred to as a first RE for short. An RE occupied by a channel measurement reference signal and indicated by the one or more pieces of channel measurement reference signal configuration information associated with the CDM group occupied by the first DMRS may be referred to as a second RE for short.

In a possible design, the first PDSCH is not mapped to the first RE and/or the second RE. In this way, a terminal may determine, based on a position of the first RE and/or a position of the second RE, a position of an RE for mapping the first PDSCH in a time-frequency resource of the first PDSCH.

In a possible design, the first control resource set does not occupy the first RE and/or the second RE. In other words, a position of an RE occupied by the first control resource set does not overlap the position of the first RE and/or the position of the second RE. In this way, the terminal may determine, based on the position of the first RE and/or the position of the second RE, whether to detect the DCI on the first control resource set. Specifically, if the position of the RE occupied by the first control resource set overlaps the position of the first RE and/or the position of the second RE, the terminal does not detect the first DCI on the first control resource set. If the position of the RE occupied by the first control resource set does not overlap the position of the first RE and/or the position of the second RE, the terminal detects the first DCI on the first control resource set.

In a possible design, the one or more pieces of channel measurement reference signal configuration information in the N pieces of channel measurement reference signal configuration information are associated with the second control resource set; and/or the one or more pieces of channel measurement reference signal configuration information are associated with a CDM group occupied by the second DMRS. An RE occupied by a channel measurement reference signal and indicated by the one or more pieces of channel measurement reference signal configuration information associated with the second control resource set may be referred to as a third RE for short. An RE occupied by a channel measurement reference signal and indicated by the one or more pieces of channel measurement reference signal configuration information associated with the CDM group occupied by the second DMRS may be referred to as a fourth RE for short.

In a possible design, the second PDSCH is not mapped to the third RE and/or the fourth RE. In this way, the terminal may determine, based on a position of the third RE and/or a position of the fourth RE, a position of an RE for mapping the second PDSCH in a time-frequency resource of the second PDSCH.

In a possible design, the second control resource set does not occupy the third RE and/or the fourth RE. In other words, a position of an RE occupied by the second control resource set does not overlap the position of the third RE and/or the position of the fourth RE. In this way, the terminal may determine, based on the position of the third RE and/or the position of the fourth RE, whether to detect the DCI on the second control resource set. Specifically, if the position of the RE occupied by the second control resource set overlaps the position of the third RE and/or the position of the fourth RE, the terminal does not detect the second DCI on the second control resource set. If the position of the RE occupied by the second control resource set does not overlap the position of the third RE and/or the position of the fourth RE, the terminal detects the second DCI on the second control resource set.

The one or more pieces of channel measurement reference signal configuration information associated with the first control resource set are different from the one or more pieces of channel measurement reference signal configuration information associated with the second control resource set. Alternatively, the one or more pieces of channel measurement reference signal configuration information associated with the first control resource set are the same as the one or more pieces of channel measurement reference signal configuration information associated with the second control resource set.

The one or more pieces of channel measurement reference signal configuration information associated with the CDM group occupied by the first DMRS are different from the one or more pieces of channel measurement reference signal configuration information associated with the CDM group occupied by the second DMRS. The one or more pieces of channel measurement reference signal configuration information associated with the CDM group occupied by the first DMRS are the same as the one or more pieces of channel measurement reference signal configuration information associated with the CDM group occupied by the second DMRS.

In a possible design, QCL information of the first PDSCH is different from QCL information of the second PDSCH.

In a possible design, the CDM group occupied by the first DMRS is different from the CDM group occupied by the second DMRS.

In a possible design, a time domain resource occupied by the first PDSCH partially overlaps/completely overlaps a time domain resource occupied by the second PDSCH.

In a possible design, the first PDSCH and the second PDSCH are located in a same BWP/CC.

In a possible design, the first control resource set and the second control resource set are located in a same BWP/CC.

In a possible design, QCL information of the first control resource set is different from QCL information of the second control resource set.

In a possible design, a PUCCH resource set corresponding to the first control resource set is different from a PUCCH resource set corresponding to the second control resource set; or a PUCCH candidate resource pool corresponding to a PUCCH resource selection field in the first DCI is different from a PUCCH candidate resource pool corresponding to a PUCCH resource selection field in the second DCI.

In a possible design, a PDSCH configuration parameter set corresponding to the first control resource set is different from a PDSCH configuration parameter set corresponding to the second control resource set.

In a possible design, the first control resource set and the second control resource set correspond to different candidate hybrid automatic repeat request processes.

In a possible design, time domain positions occupied by the channel measurement reference signals and indicated by all of the N pieces of channel measurement reference signal configuration information are the same, and the time domain position includes a position of a slot and a position of the OFDM symbol occupied by the channel measurement reference signal in the slot.

According to a fourth aspect, a communication apparatus is provided, and includes: a communication module, configured to obtain N pieces of channel measurement reference signal configuration information, where the channel measurement reference signal configuration information is used to indicate a resource occupied by a channel measurement reference signal on one carrier/serving cell/bandwidth part, the resource occupied by the channel measurement reference signal includes a time domain resource, and N is a positive integer; and a processing module, configured to determine, based on the N pieces of channel measurement reference signal configuration information, an OFDM symbol occupied by a DMRS in a first time unit.

In a possible design, when the channel measurement reference signal configuration information is used to indicate a time-frequency resource occupied by the channel measurement reference signal, the channel measurement reference signal configuration information may include at least one of the following: a periodicity and an offset in time domain, a quantity and/or positions of OFDM symbols occupied in one slot or subframe, a quantity and/or positions of occupied RBs, a quantity and/or positions of subcarriers occupied in one RB, and a quantity and/or positions of REs.

In a possible design, the time-frequency resource of the channel measurement reference signal includes an OFDM symbol, and any OFDM symbol occupied by the DMRS does not overlap any OFDM symbol occupied by channel measurement reference signals and indicated by the N pieces of channel measurement reference signal configuration information, where the OFDM symbol is an OFDM symbol in a specified slot or subframe.

In a possible design, if an OFDM symbol occupied by a channel measurement reference signal and indicated by at least one of the N pieces of channel measurement reference signal configuration information includes a first OFDM symbol, the OFDM symbol occupied by the DMRS does not include the first OFDM symbol, and the OFDM symbol occupied by the DMRS includes a second OFDM symbol.

In a possible design, if OFDM symbols indicated by the N pieces of channel measurement reference signal configuration information do not include a first OFDM symbol, the OFDM symbol occupied by the DMRS includes the first OFDM symbol, and the OFDM symbol occupied by the DMRS does not include a second OFDM symbol.

In a possible design, the first OFDM symbol and the second OFDM symbol are OFDM symbols other than a start OFDM symbol of a PDSCH corresponding to the DMRS. Specifically, if a quantity of consecutive OFDM symbols occupied by the DMRS is 1, that is, the DMRS is a single-symbol DMRS, the first OFDM symbol and the second OFDM symbol are OFDM symbols other than the first OFDM symbol in a time domain resource of the PDSCH. If a quantity of consecutive OFDM symbols occupied by the DMRS is 2, that is, the DMRS is a double-symbol DMRS, the first OFDM symbol and the second OFDM symbol are OFDM symbols other than the first OFDM symbol and the second OFDM symbol in a time domain resource of the PDSCH.

In a possible design, a quantity of OFDM symbols occupied by the PDSCH in one slot or subframe is greater than 11, and the first OFDM symbol and the second OFDM symbol are the last two OFDM symbols in the time domain resource of the PDSCH.

In a possible design, the first time unit is a slot in which the PDSCH corresponding to the DMRS is located, the first OFDM symbol is the twelfth OFDM symbol in the first time unit, and the second OFDM symbol is the thirteenth OFDM symbol in the first time unit.

In a possible design, the first time unit is a slot in which the PDSCH corresponding to the DMRS is located, the first OFDM symbol is the eighth OFDM symbol in the first time unit, and the second OFDM symbol is the ninth OFDM symbol in the first time unit, or the second OFDM symbol is the seventh OFDM symbol in the first time unit.

In a possible design, one or more pieces of channel measurement reference signal configuration information in the N pieces of channel measurement reference signal configuration information are associated with a control resource set, the control resource set is used to carry DCI, and the DCI is used to schedule the PDSCH corresponding to the DMRS; and/or the one or more pieces of channel measurement reference signal configuration information in the N pieces of channel measurement reference signal configuration information are associated with a code division multiplexing (CDM) group occupied by the DMRS.

In a possible design, a resource occupied by a channel measurement reference signal and indicated by the one or more pieces of channel measurement reference signal configuration information includes a plurality of REs, and the PDSCH corresponding to the DMRS is not mapped to the REs occupied by the channel measurement reference signal and indicated by the one or more pieces of channel measurement reference signal configuration information.

In a possible design, the resource occupied by the channel measurement reference signal and indicated by the one or more pieces of channel measurement reference signal configuration information includes the plurality of REs, and a position of an RE occupied by the control resource set does not overlap positions of the REs occupied by the channel measurement reference signal and indicated by the one or more pieces of channel measurement reference signal configuration information.

In a possible design, the PDSCH corresponding to the DMRS is not mapped to an RE occupied by a channel measurement reference signal and indicated by channel measurement reference signal configuration information in a first subset; and/or the position of the RE occupied by the control resource set does not overlap a position of an RE occupied by a channel measurement reference signal and indicated by channel measurement reference signal configuration information in a second subset.

The first subset includes one or more pieces of channel measurement reference signal configuration information in the N pieces of channel measurement reference signal configuration information. The second subset includes one or more pieces of channel measurement reference signal configuration information in the N pieces of channel measurement reference signal configuration information. It may be understood that the first subset and the second subset may be the same or different.

In a possible design, time domain positions occupied by the channel measurement reference signals and indicated by all of the N pieces of channel measurement reference signal configuration information are the same, and the time domain position includes a position of a slot and a position of the OFDM symbol occupied by the channel measurement reference signal in the slot.

According to a fifth aspect, a communication apparatus is provided, and includes a processor and a memory, where the memory is coupled to the processor, and the memory stores instructions. When the processor executes the instructions, the communication apparatus is enabled to perform the resource determining method according to any design in the first aspect or the second aspect. Optionally, the communication apparatus may further include a communication interface. The communication interface is used by the communication apparatus to communicate with another device. For example, the communication interface may be a transceiver, a circuit, a bus, a module, or another type of communication interface.

According to a sixth aspect, a computer-readable storage medium is provided. The computer-readable storage medium stores instructions. When run on a computer, the instructions may enable the computer to perform the resource determining method according to any design in the first aspect or the second aspect.

According to a seventh aspect, a computer program product including instructions is provided. When run on a computer, the computer program product enables the computer to perform the resource determining method according to any design in the first aspect or the second aspect.

According to an eighth aspect, a chip is provided. The chip includes a processor. When the processor executes instructions, the processor is configured to perform the resource determining method according to any design in the first aspect or the second aspect. The instructions may be from a memory inside the chip, or may be from a memory outside the chip. Optionally, the chip further includes an input/output circuit.

According to a ninth aspect, a system is provided. The system includes at least one communication apparatus that performs the resource determining method according to any design in the first aspect and at least one communication apparatus that performs the resource determining method according to any design in the second aspect.

For technical effects brought by any design in the third aspect to the eighth aspect, refer to technical effects brought by the foregoing corresponding methods.

DESCRIPTION OF EMBODIMENTS

Figure 1:
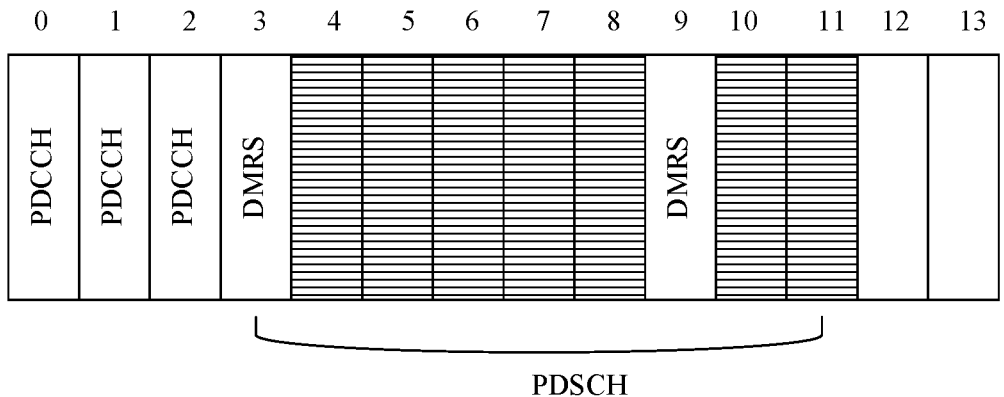
FIG. 1 is a schematic diagram of a position of a DMRS according to an embodiment of this application.

In the description of this application, unless otherwise specified, "/" means "or". For example, A/B may represent A or B. "And/or" in this specification describes only an association relationship between associated objects and represents that there may be three relationships. For example, A and/or B may represent the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference either.

It should be noted that, in this application, the word such as "exemplary" or "for example" is used to represent giving an example, an illustration, or a description. Any embodiment or design scheme described as an "exemplary" or "for example" in this application should not be explained as being more preferred or having more advantages than another embodiment or design scheme. Exactly, use of the word "exemplary" or "for example" is intended to present a relative concept in a specific manner.

To facilitate understanding of technical solutions in this application, the following first briefly describes terms in this application.

1. Slot

In NR, for a normal cyclic prefix (CP), one slot includes 14 OFDM symbols. For an extended CP, one slot includes 12 OFDM symbols.

For ease of description, in embodiments of this application, unless otherwise specified, one slot includes 14 OFDM symbols. In addition, in one slot, 14 OFDM symbols are sequentially numbered in chronological order from front to back, an earliest OFDM symbol is numbered 0, and a latest OFDM symbol is numbered 13. In other words, the slot includes the OFDM symbol #0 to the OFDM symbol #13.

2. Subframe

In LTE, the subframe includes 14 OFDM symbols. In one subframe, 14 OFDM symbols are sequentially numbered in chronological order from front to back, an earliest OFDM symbol is numbered 0, and a latest OFDM symbol is numbered 13. In other words, the subframe includes the OFDM symbol #0 to the OFDM symbol #13.

When an NR network and an LTE network use a same subcarrier spacing, the slot in NR is equivalent to the subframe in LTE.

3. Quasi-Colocation (QCL) Lnformation

The QCL information is used to assist in describing beamforming information and a receiving procedure on a receive side of a terminal, represents a large-scale feature of a channel, is usually a long-term observation value, and may further represent receive beam information. Specifically, four types of the QCL information are defined in an existing standard, and are:

QCL types A: a Doppler shift, a Doppler spread, an average delay, and a delay spread;

QCL types B: the Doppler shift and the Doppler spread;

QCL types C: the average delay and the Doppler shift; and

QCL types D: a spatial reception parameter (spatial Rx parameter).

QCL information of a PDSCH or a PDCCH is defined by establishing an association relationship between a DMRS on the PDSCH/PDCCH and a reference signal resource. That is, the QCL information of the PDSCH/PDCCH may be determined based on receiving and measurement of a reference signal associated with the DMRS on the PDSCH/PDCCH. For example, the DMRS may be associated with a channel state information reference signal (CSI-RS), and a receive beam (QCL Type-D) used by the terminal to receive the CSI-RS may be used as a receive beam for receiving the DMRS.

4. Code Division Multiplexing (CDM) Group

The CDM group includes a plurality of antenna ports. A plurality of antenna ports in a same CDM group share a same time-frequency resource, and the plurality of antenna ports in the same CDM group are distinguished in a form of code division, that is, code domain resources of sequences of the plurality of antenna ports in the same CDM group are different. The code domain resource is usually an orthogonal code, for example, an orthogonal cover code (OCC). The OCC code may be used in time domain, frequency domain, space domain (beam domain), and the like.

5. Control Resource Set (CORESET) and Control Resource Set Group

The control resource set is used to indicate a time-frequency resource on which the physical downlink control channel (PDCCH) is located, and the PDCCH is used to carry DCI. In other words, the time-frequency resource occupied by the PDCCH uses the CORESET as a configuration unit, and represents a physical time-frequency resource that carries the DCI in one DCI detection periodicity. Usually, the CORESET may occupy one to three OFDM symbols in time domain, and an occupied bandwidth is indicated at a granularity of six RBs in frequency domain. In addition, a QCL assumption used for receiving the DCI and a corresponding DMRS on the physical time-frequency resource is further configured in the CORESET. From a perspective of the terminal, each CC and BWP used for communication correspond to one or more CORESETs.

The control resource set group may include one or more control resource sets.

6. DMRS

The terminal may perform channel estimation based on the DMRS, and a result of the channel estimation may be used to receive and demodulate a PDSCH corresponding to the DMRS. The DMRS occupies some OFDM symbols on the PDSCH. In other words, the some OFDM symbols on the PDSCH are used to carry the DMRS. Specifically, a base station schedules a time-frequency resource of the PDSCH by using DCI. The base station and the terminal pre-agree on positions of time-frequency resources that are on the PDSCH and that are occupied by the DMRS, and the DCI also includes position information of the DMRS. In this way, the terminal finally determines, based on a pre-agreed position relationship between the PDSCH and the time-frequency resources occupied by the DMRS and the DMRS position information indicated in the DCI, the time-frequency resource occupied by the DMRS. The DMRS includes two types: One is a single-symbol DMRS, and the other is a double-symbol DMRS. The single-symbol DMRS means that a quantity of consecutive OFDM symbols occupied by the DMRS is 1. The double-symbol DMRS means that a quantity of consecutive OFDM symbols occupied by the DMRS is 2. The following uses the single-symbol DMRS as an example for description.

DMRSs may be classified into a front-loaded DMRS and an additional DMRS based on positions of OFDM symbols on a PDSCH and occupied by the DMRSs.

The front-loaded DMRS occupies the first OFDM symbol on the PDSCH. The terminal may determine the first OFDM symbol on the PDSCH based on a time domain position that is of the PDSCH and that is indicated in DCI, to determine a position of the OFDM symbol occupied by the front-loaded DMRS.

The PDSCH includes the additional DMRS only when the base station configures, by using higher layer signaling such as RRC signaling, that there is the additional DMRS. The higher layer signaling also indicates a quantity of additional DMRSs. For example, the quantity may be 1, 2, or 3. A position of an OFDM symbol occupied by the additional DMRS is determined based on the quantity of additional DMRSs configured by using the RRC signaling and a corresponding length of the PDSCH in one slot. The length of the PDSCH in the slot is a quantity of OFDM symbols occupied by the PDSCH in the slot. Usually, the additional DMRS occupies at least one of the last two of the OFDM symbols occupied by the PDSCH. When the quantity of additional DMRSs is 2 or 3, in addition to a position of the foregoing OFDM symbol, there is further a position of an OFDM symbol of a DMRS between the position of the OFDM symbol of the front-loaded DMRS and a position of an OFDM symbol at a trailer of the PDSCH. Because channel estimation extrapolation filtering is performed based on a DMRS, and more than two OFDM symbols cause a relatively loss in performance of the channel estimation, a DMRS located at the trailer of the PDSCH is relatively important, to prevent an extrapolation of more than two OFDM symbols.

For example, for positions of OFDM symbols occupied by a DMRS, refer to Table 1.

For a PDSCH mapping type A, $l_d$ is a quantity of OFDM symbols between the first OFDM symbol in a slot and the last OFDM symbol in a time domain resource of a PDSCH.

$l_0$ is used to indicate a position of the first OFDM symbol occupied by the DMRS. For the PDSCH mapping type A, $l_0=2$ or 3, a reference point of $l_0$ is the first OFDM symbol in the slot. That is, when $l_0=2$, the first OFDM symbol occupied by the DMRS is an OFDM symbol #2 in the slot. When $l_0=3$, the first OFDM symbol occupied by the DMRS is an OFDM symbol #3 in the slot.

When $l_0=3$, a CRS configuration parameter has been configured, and the CRS configuration parameter indicates that a CRS occupies an OFDM symbol #11 in the slot in which the PDSCH is located, $l_1=12$. In other cases, $l_1=11$.

For example, when $l_0=3$, $l_d=12$, and $l_1=11$, a position of the DMRS may be shown in FIG. 1.

Figure 2:
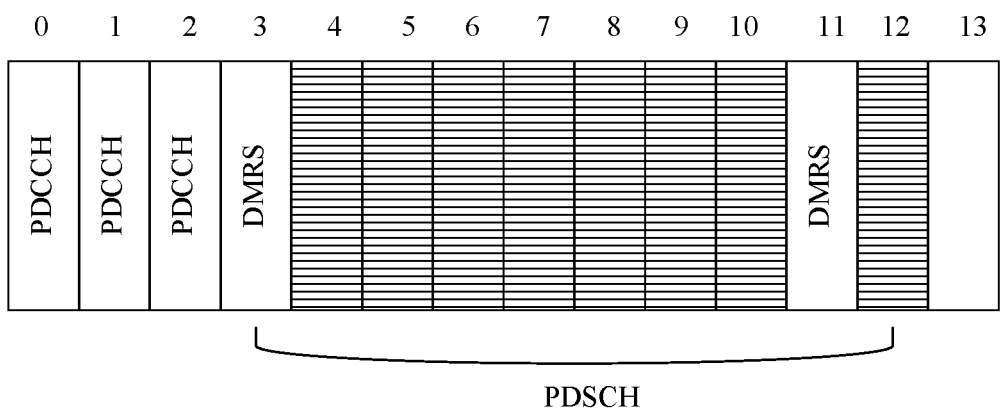
FIG. 2 is a schematic diagram of another position of the DMRS according to an embodiment of this application.

For example, when $l_0=3$, $l_d=13$, and $l_1=11$, a position of the DMRS may be shown in FIG. 2.

Figure 3:
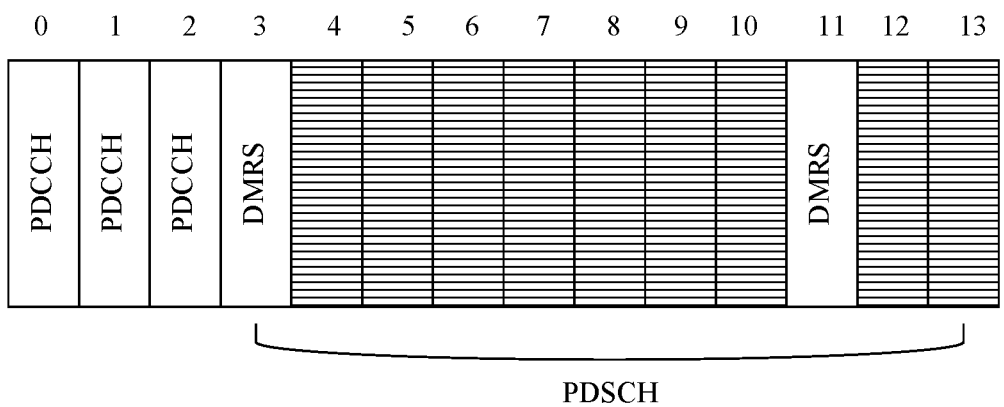
FIG. 3 is a schematic diagram of another position of the DMRS according to an embodiment of this application.

For example, when $l_0=3$, $l_d=14$, and $l_1=11$, a position of the DMRS may be shown in FIG. 3.

TABLE 1

| | DM-RS positions $\bar{l}$ PDSCH mapping type A dmrs-AdditionalPosition | | | |
|---|---|---|---|---|
| $l_d$ in symbols | 0 | 1 | 2 | 3 |
| 2 | — | — | — | — |
| 3 | $l_0$ | $l_0$ | $l_0$ | $l_0$ |
| 4 | $l_0$ | $l_0$ | $l_0$ | $l_0$ |
| 5 | $l_0$ | $l_0$ | $l_0$ | $l_0$ |
| 6 | $l_0$ | $l_0$ | $l_0$ | $l_0$ |
| 7 | $l_0$ | $l_0$ | $l_0$ | $l_0$ |
| 8 | $l_0$ | $l_0$ and 7 | $l_0$ and 7 | $l_0$ and 7 |
| 9 | $l_0$ | $l_0$ and 7 | $l_0$ and 7 | $l_0$ and 7 |
| 10 | $l_0$ | $l_0$ and 9 | $l_0$, 6, and 9 | $l_0$, 6, and 9 |
| 11 | $l_0$ | $l_0$ and 9 | $l_0$, 6, and 9 | $l_0$, 6, and 9 |
| 12 | $l_0$ | $l_0$ and 9 | $l_0$, 6, and 9 | $l_0$, 5, 8, and 11 |
| 13 | $l_0$ | $l_0$ and $l_1$ | $l_0$, 7, and 11 | $l_0$, 5, 8, and 11 |
| 14 | $l_0$ | $l_0$ and $l_1$ | $l_0$, 7, and 11 | $l_0$, 5, 8, and 11 |

It should be noted that, in a NIB scenario, because time-frequency resources occupied by two PDSCHs respectively scheduled by two base stations are determined in real time, it may be understood that, when there is at least one additional DMRS in DMRSs on both of the two PDSCHs, time domain positions of the PDSCHs scheduled by the two base stations need to be limited, to ensure that DMRSs on PDSCHs of a plurality of TRPs are aligned in time domain to ensure performance of DMRS-based channel estimation. Specifically, if the two PDSCHs are scheduled in a same slot, a quantity of OFDM symbols on the other PDSCH is also X if a quantity of OFDM symbols on one PDSCH is X. In addition, start positions of the PDSCHs in time domain need to be consistent, so that the DMRSs (including a front-loaded DMRS and the additional DMRS) corresponding to the two PDSCHs occupy same OFDM symbols. Optionally, X may be selected from 12 to 14.

7. DMRS Corresponding to a PDSCH and PDSCH Corresponding to a DMRS

The DMRS corresponding to the PDSCH is a DMRS used to demodulate the PDSCH. An OFDM symbol occupied by the DMRS corresponding to the PDSCH is located on a time domain resource of the PDSCH.

The PDSCH corresponding to the DMRS is a PDSCH demodulated by using the DMRS. A time domain resource of the PDSCH corresponding to the DMRS includes an OFDM symbol occupied by the DMRS.

8. CRS

In LTE, the CRS is used to implement functions such as performing channel estimation on a downlink physical channel to demodulate data information and performing channel measurement so that the terminal obtains CSI information and reports the CSI information to the base station. The CRS supports configurations of one, two, and four antenna ports.

Figure 4:
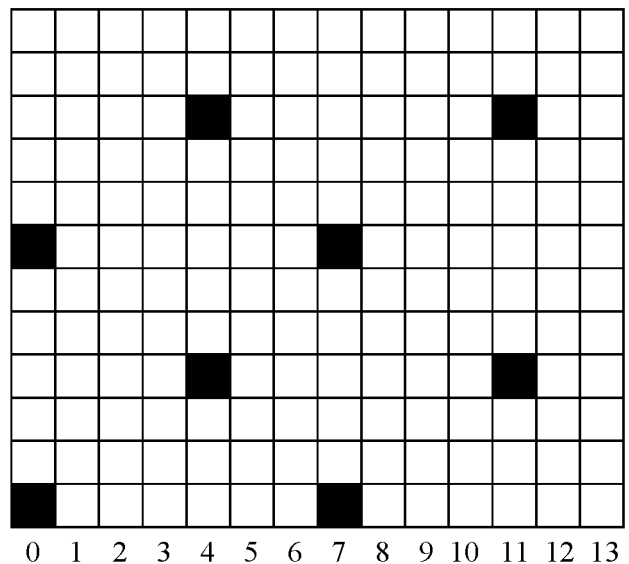
FIG. 4 is a schematic diagram of a resource pattern of a CRS according to an embodiment of this application.

FIG. 4 shows a resource pattern of a CRS supporting one antenna port. In this case, the CRS occupies an OFDM symbol #0, an OFDM symbol #4, an OFDM symbol #7, and an OFDM symbol #11 in a subframe.

Figure 5:
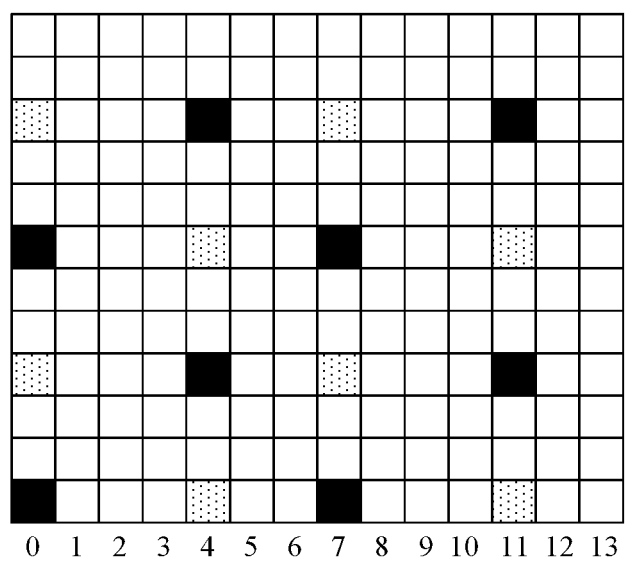
FIG. 5 is a schematic diagram of a resource pattern of another CRS according to an embodiment of this application.

FIG. 5 shows a resource pattern of a CRS supporting two antenna ports. In this case, the CRS occupies an OFDM symbol #0, an OFDM symbol #4, an OFDM symbol #7, and an OFDM symbol #11 in a subframe.

Figure 6:
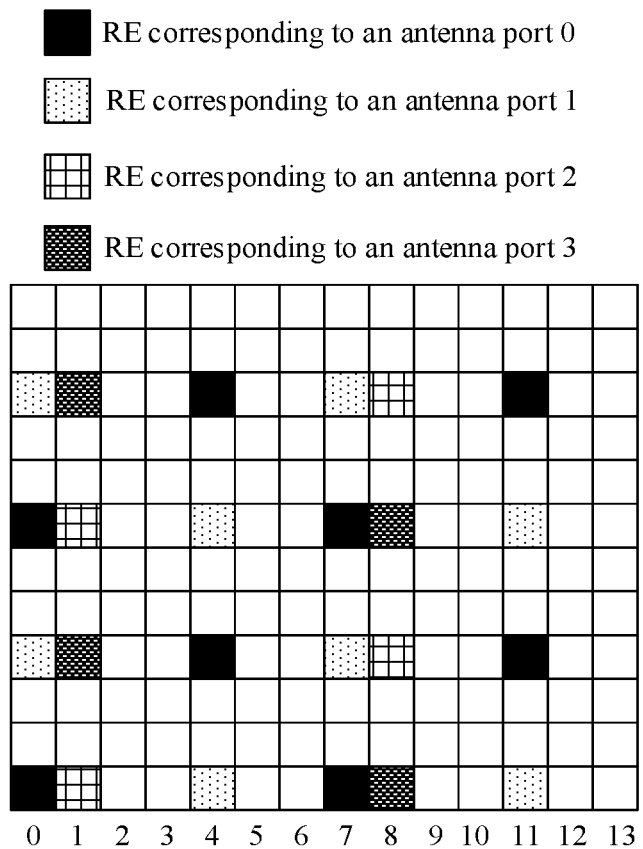
FIG. 6 is a schematic diagram of a resource pattern of another CRS according to an embodiment of this application.

FIG. 6 shows a resource pattern of a CRS supporting four antenna ports. In this case, the CRS occupies an OFDM symbol #0, an OFDM symbol #2, an OFDM symbol #4, an OFDM symbol #7, an OFDM symbol #8, and an OFDM symbol #11 in a subframe.

The foregoing briefly describes the technical terms in the embodiments of this application. Details are not described below again.

Currently, in a CoMP scenario, if a plurality of TRPs in a coordinated set each have a configuration in which LTE and NR are co-sited, a set of independent CRS configuration parameters needs to be separately configured for the plurality of TRPs. For example, that CRSs occupy different slots, that the CRSs occupy different OFDM symbols, and/or that the CRSs occupy different RBs and a subcarrier in each RB may be configured for different TRPs. That CRS configuration parameters are independently configured for the different TRPs represents that serving cells corresponding to the different TRPs use time-frequency resource patterns of different CRSs. Different CRS configuration parameters may be configured by using independent RRC signaling, or may be configured by using same RRC signaling. For example, if there is one master TRP in the plurality of TRPs in the coordinated set, the master TRP may send RRC signaling to another TRP, to configure a set of independent CRS configuration parameters for the another TRP.

When the CRS configuration parameters are independently configured for the plurality of TRPs, DMRSs corresponding to PDSCHs independently scheduled by the plurality of TRPs may be aligned in time domain.

An example in which a TRP #1 and a TRP #2 form a coordinated set to serve one terminal together is used for description below. In a slot #1, the TPR 1 schedules a PDSCH #1 by using DCI delivered on a CORESET 1, the TRP #2 schedules a PDSCH #2 by using DCI delivered on a CORESET 2, and OFDM symbol lengths of both the PDSCH #1 and the PDSCH #2 are 13 or 14. A DMRS on the PDSCH #1 is referred to as a DMRS #1, and a DMRS on the PDSCH #2 is referred to as a DMRS #2. For either of the DMRS #1 and the DMRS #2, a quantity of additional DMRSs is 1. Configuration information of a CRS #1 corresponds to a time-frequency resource occupied by the TRP #1 to send a CRS 1, and configuration information of a CRS #2 corresponds to a time-frequency resource occupied by the TRP #2 to send a CRS 2. Because the configuration information of the CRS #1 and the configuration information of the CRS #2 are configured by using independent RRC signaling, the configuration information of the CRS #1 and the configuration information of the CRS #2 may be different. For example, it is assumed that the configuration information of the CRS #1 indicates that the CRS #1 occupies an OFDM symbol #0, an OFDM symbol #4, an OFDM symbol #7, and an OFDM symbol #11 in a slot #1, and the configuration information of the CRS #2 indicates that the CRS #2 occupies an OFDM symbol #0, an OFDM symbol #4, an OFDM symbol #7, and an OFDM symbol #11 in a slot #2. In this case, an OFDM symbol occupied by the DMRS #1 is determined based on the configuration information of the CRS #1, and an OFDM symbol occupied by the DMRS #2 is determined based on the configuration information of the CRS #2. In the slot #1, the OFDM symbol occupied by the DMRS #1 needs to avoid the OFDM symbols occupied by the CRS #1. Therefore, the DMRS #1 occupies an OFDM symbol #12. In the slot 1, because the CRS #2 does not occupy any OFDM symbol, the DMRS #2 may occupy the OFDM symbol #11. In this way, the DMRS #1 and the DMRS #2 are not aligned in time domain. Consequently, performance of DMRS-based channel estimation of the terminal is affected.

To resolve the foregoing technical problem, this application provides a resource determining method. For specific descriptions of the method, refer to the following descriptions.

The technical solutions provided in the embodiments of this application may be applied to various communication systems, for example, a new radio (NR) communication system using a 5th generation (5G) communication technology, a future evolved system, or a plurality of convergent communication systems. The technical solutions provided in this application may be applied to a plurality of application scenarios, for example, machine to machine (M2M), macro-micro communication, enhanced mobile broadband (eMBB), ultra-reliable and low-latency communication (uRLLC), and massive machine-type communications (mMTC). These scenarios may include but are not limited to a scenario of communication between communication devices, a scenario of communication between network devices, a scenario of communication between a network device and a communication device, and the like. The following provides descriptions by using an example in which the technical solutions are applied to a scenario of communication between a network device and a terminal.

In addition, a network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that with evolution of the network architecture and emergence of a new service scenario, the technical solutions provided in the embodiments of this application are also applicable to similar technical problems.

Figure 7:
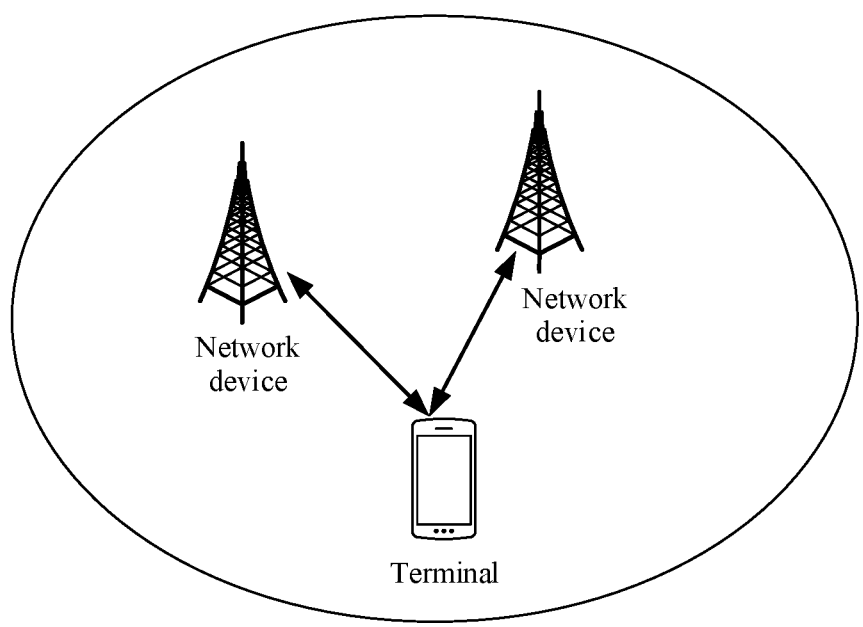
FIG. 7 is a schematic diagram of an architecture of a communication system according to an embodiment of this application.

FIG. 7 is a schematic diagram of an architecture of a communication system to which the technical solutions provided in this application are applicable. The communication system may include a plurality of network devices (FIG. 7 shows only two network devices) and one or more terminals (FIG. 7 shows only one terminal). As shown in FIG. 7, the two network devices may simultaneously communicate with the terminal.

The network device may be a base station, a base station controller, or the like in wireless communication. The base station may include various types of base stations, such as a micro base station (also referred to as a small cell), a macro base station, a relay station, and an access point. This is not specifically limited in the embodiments of this application. In the embodiments of this application, the base station may be a base transceiver station (BTS) in a global system for mobile communications (GSM) or code division multiple access (CDMA), a NodeB in wideband code division multiple access (WCDMA), an evolved NodeB (eNB or eNodeB) in long term evolution (LTE), an eNB in an internet of things (IoT) or an narrowband internet of things (NB-IoT), or a base station in a future 5G mobile communication network or a future evolved public land mobile network (PLMN). This is not limited in the embodiments of this application. In the embodiments of this application, an apparatus configured to implement a function of the network device may be a network device, or may be an apparatus, for example, a chip system, that can support the network device in implementing the function. In the embodiments of this application, an example in which the apparatus configured to implement the function of the network device is the network device is used to describe the technical solutions provided in the embodiments of this application.

The network device described in this application, for example, the base station, usually includes a baseband unit (BBU), a remote radio unit (RRU), an antenna, and a feeder used to connect the RRU and the antenna. The BBU is configured to be responsible for signal modulation. The RRU is configured to be responsible for radio frequency processing. The antenna is configured to be responsible for conversion between a pilot wave on a cable and a space wave in the air. On one hand, a distributed base station greatly shortens a length of the feeder between the RRU and the antenna, to reduce a signal loss, and reduce costs of the feeder. On the other hand, the RRU and the antenna are relatively small and can be installed anywhere, making network planning more flexible. The RRU may be remotely placed. In addition to that, all BBUs may be centralized and placed in a central office (CO). In this centralized manner, a quantity of base station equipment rooms can be greatly reduced, energy consumption of auxiliary devices, especially air conditioners, can be reduced, and carbon emission can be greatly reduced. In addition, after distributed BBUs are integrated into a BBU baseband pool, the BBUs can be managed and scheduled centrally, and resources can be allocated more flexibly. In this mode, all physical base stations evolve into virtual base stations. All the virtual base stations share information such as data sent and received by users and channel quality in the BBU baseband pool, and cooperate with each other, to implement joint scheduling.

In some deployments, the base station may include a centralized unit (CU) and a distributed unit (DU). The base station may further include an active antenna unit (AAU). The CU implements some functions of the base station, and the DU implements some functions of the base station. For example, the CU is responsible for processing a non-real-time protocol and service, and implements functions of a radio resource control (RRC) and a packet data convergence protocol (PDCP) layer. The DU is responsible for processing a physical layer protocol and a real-time service, and implements functions of a radio link control (RLC) layer, a media access control (MAC) layer, and a physical (PHY) layer. The AAU implements some physical layer processing functions, radio frequency processing, and a function related to an active antenna. Information at the RRC layer eventually becomes information at the PHY layer, or is converted from the information at the PHY layer. Therefore, in this architecture, higher layer signaling, for example, RRC layer signaling or PDCP layer signaling, may also be considered as being sent by the DU or sent by the DU and the AAU. It may be understood that a network device may be a device including one or more of a CU node, a DU node, and an AAU node. In addition, the CU may be classified as a network device in a RAN, or the CU may be classified as a network device in a core network (CN). This is not limited herein.

The terminal is a device that has a wireless transceiving function. The terminal may be deployed on land, and includes an indoor or outdoor device, a handheld device, or a vehicle-mounted device, may be deployed on a water surface (for example, on a ship), or may be deployed in air (for example, on an aircraft, a balloon, and a satellite). The terminal device may be user equipment (UE). The UE includes a handheld device, a vehicle-mounted device, a wearable device, or a computing device that has a wireless communication function. For example, the UE may be a mobile phone, a tablet computer, or a computer having a wireless transceiving function. Alternatively, the terminal device may be a virtual reality (VR) terminal device, an augmented reality (AR) terminal device, a wireless terminal in industrial control, a wireless terminal in self-driving, a wireless terminal in telemedicine, a wireless terminal in a smart grid, a wireless terminal in a smart city, a wireless terminal in a smart home, or the like. In the embodiments of this application, an apparatus configured to implement a function of the terminal may be a terminal, or may be an apparatus, for example, a chip system, that can support the terminal in implementing the function. In the embodiments of this application, the chip system may include a chip, or may include the chip and another discrete component. In the embodiments of this application, an example in which the apparatus configured to implement the function of the terminal is the terminal is used to describe the technical solutions provided in the embodiments of this application.

Figure 8:
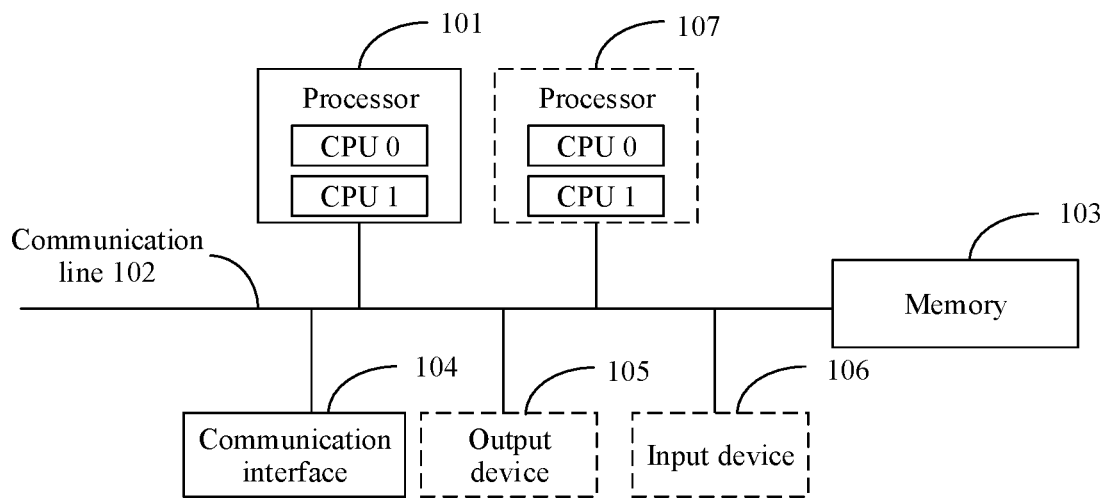
FIG. 8 is a schematic diagram of a structure of a communication apparatus according to an embodiment of this application.

As shown in FIG. 8, the communication apparatus includes at least one processor 101, a communication line 102, a memory 103, and at least one communication interface 104.

The processor 101 may be a general-purpose central processing unit (CPU), a microprocessor, an application-specific integrated circuit (ASIC), or one or more integrated circuits configured to control program execution of the solutions in this application.

The communication line 102 may include a path on which information is transferred between the foregoing components.

The communication interface 104, which uses any apparatus such as a transceiver, is configured to communicate with another device or communication network, such as an Ethernet, a RAN, and a wireless local area network (WLAN).

The memory 103 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, or the like), a disk storage medium or another magnetic storage device, or any other medium that can be configured to carry or store expected program code having an instruction or data structure form and that can be accessed by a computer. However, the memory 103 is not limited thereto. The memory may exist independently, and is connected to the processor through the communication line 102. The memory may alternatively be integrated with the processor. The memory provided in this embodiment of this application may usually be non-volatile. The memory 103 is configured to store computer-executable instructions for performing the solutions in this application, and the processor 101 controls execution of the computer-executable instructions. The processor 101 is configured to execute the computer-executable instructions stored in the memory 103, to implement the methods provided in the following embodiments of this application.

Optionally, the computer-executable instructions in this embodiment of this application may also be referred to as application program code. This is not specifically limited in this embodiment of this application.

During specific implementation, in an embodiment, the processor 101 may include one or more CPUs such as a CPU 0 and a CPU 1 shown in FIG. 8.

During specific implementation, in an embodiment, the communication apparatus may include a plurality of processors such as the processor 101 and a processor 107 in FIG. 8. Each of the processors may be a single-core (single-CPU) processor or a multi-core (multi-CPU) processor. Herein, the processor may be one or more devices, circuits, and/or processing cores configured to process data (for example, computer program instructions).

During specific implementation, in an embodiment, the communication apparatus may further include an output device 105 and an input device 106. The output device 105 communicates with the processor 101, and may display information in a plurality of manners. For example, the output device 105 may be a liquid crystal display (LCD), a light emitting diode (LED) display device, a cathode ray tube (CRT) display device, or a projector. The input device 106 communicates with the processor 101, and may receive an input from a user in a plurality of manners. For example, the input device 106 may be a mouse, a keyboard, a touchscreen device, or a sensor device.

The following specifically describes the technical solutions provided in the embodiments of this application with reference to the accompanying drawings of the specification.

Figure 9:
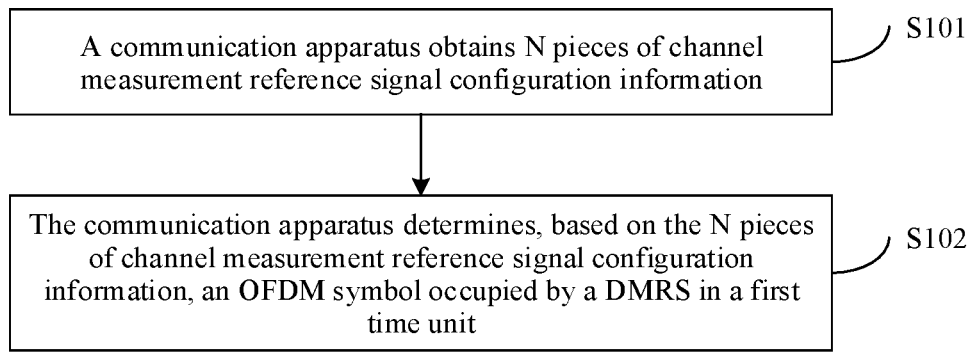
FIG. 9 is a flowchart of a resource determining method according to an embodiment of this application.

FIG. 9 shows a resource determining method according to an embodiment of this application. The method includes the following steps.

S101: A communication apparatus obtains N pieces of channel measurement reference signal configuration information.

The channel measurement reference signal configuration information is used to indicate a resource occupied by a channel measurement reference signal on one carrier/serving cell/bandwidth part. The resource occupied by the channel measurement reference signal includes a time-frequency resource.

The time-frequency resource occupied by the channel measurement reference signal includes an OFDM symbol. Alternatively, the time-frequency resource occupied by the channel measurement reference signal includes a plurality of REs.

Optionally, if the channel measurement reference signal configuration information is used to indicate the time-frequency resource occupied by the channel measurement reference signal, the channel measurement reference signal configuration information may include at least one of the following information: a periodicity and an offset in time domain, a quantity and/or positions of OFDM symbols occupied in one slot/subframe, a quantity and/or positions of occupied RBs, a quantity and/or positions of subcarriers occupied in one RB, a quantity and/or positions of REs, or the like.

Optionally, the channel measurement reference signal may include one of a CRS, a CSI-RS, an SSB, or an RMR.

The N pieces of channel measurement reference signal configuration information may be in a one-to-one correspondence with N TRPs. That is, the N pieces of channel measurement reference signal configuration information may be independently configured for the N TRPs. N is a positive integer.

When the communication apparatus is any one of a plurality of TRPs participating in cooperative transmission, step S101 may be specifically implemented as follows: The TRP generates channel measurement reference signal configuration information of the TRP, and the TRP obtains N−1 pieces of channel measurement reference signal configuration information from other TRPs participating in the cooperative transmission; or the TRP obtains the N pieces of channel measurement reference signal configuration information by using another network device (for example, a core network, a management device, or a master TRP).

When the communication apparatus is a terminal, step S101 may be specifically implemented as follows: The terminal separately receives channel measurement reference signal configuration information sent by each of the N TRPs; or the terminal receives channel measurement reference signal configuration information sent by one or more of the N TRPs, where one TRP may send a plurality of pieces of channel measurement reference signal configuration information.

Optionally, the N pieces of channel measurement reference signal configuration information may be received by the terminal in a same time unit, or may be separately received by the terminal in different time units.

S102: The communication apparatus determines, based on the N pieces of channel measurement reference signal configuration information, an OFDM symbol occupied by a DMRS in a first time unit.

Optionally, the first time unit may be a slot, a mini-slot, a subframe, a transmission time interval, or the like in which a PDSCH corresponding to the DMRS is located. This is not limited in the present invention. Alternatively, the first time unit may be a time domain resource occupied by the PDSCH corresponding to the DMRS. It may be understood that the PDSCH corresponding to the DMRS is a PDSCH demodulated by using the DMRS. Therefore, the DMRS may also be referred to as a DMRS on the PDSCH or a DMRS corresponding to the PDSCH.

In an implementation, if time domain positions occupied by channel measurement reference signals and indicated by all of the N pieces of channel measurement reference signal configuration information are the same, the communication apparatus may determine, based on one of the N pieces of channel measurement reference signal configuration information, the OFDM symbol occupied by the DMRS in the first time unit.

In another implementation, if time domain positions occupied by channel measurement reference signals and indicated by at least two of the N pieces of channel measurement reference signal configuration information are different, the communication apparatus determines, based on the N pieces of channel measurement reference signal configuration information, the OFDM symbol occupied by the DMRS in the first time unit.

The time domain position occupied by the channel measurement reference signal includes a position of a slot and a position of the OFDM symbol occupied by the channel measurement reference signal in the slot.

In this embodiment of this application, in the first time unit, any OFDM symbol occupied by the DMRS does not overlap any OFDM symbol occupied by the channel measurement reference signals and indicated by the N pieces of channel measurement reference signal configuration information, where the OFDM symbol is an OFDM symbol in a specified slot or subframe.

It should be noted that OFDM symbols occupied by the channel measurement reference signals and indicated by the N pieces of channel measurement reference signal configuration information specifically include an OFDM symbol occupied by the channel measurement reference signal and indicated by each of the N pieces of channel measurement reference signal configuration information.

Optionally, to ensure that the OFDM symbol occupied by the DMRS does not overlap the OFDM symbols occupied by the channel measurement reference signals and indicated by the N pieces of channel measurement reference signal configuration information, the OFDM symbol occupied by the DMRS satisfies the following rules.

Rule 1: If the OFDM symbols occupied by the channel measurement reference signals and indicated by the N pieces of channel measurement reference signal configuration information do not include a first OFDM symbol, the OFDM symbol occupied by the DMRS includes the first OFDM symbol, and the OFDM symbol occupied by the DMRS does not include a second OFDM symbol.

Rule 2: If the OFDM symbols occupied by the channel measurement reference signals and indicated by the N pieces of channel measurement reference signal configuration information include a first OFDM symbol, the OFDM symbol occupied by the DMRS does not include the first OFDM symbol, and the OFDM symbol occupied by the DMRS includes a second OFDM symbol.

It may be understood that the first OFDM symbol and the second OFDM symbol are two different OFDM symbols in a same slot or subframe. For example, the second OFDM symbol may be a preceding OFDM symbol of the first OFDM symbol. For example, the first OFDM symbol is an OFDM symbol #11, and the second OFDM symbol is an OFDM symbol #10. Alternatively, the second OFDM symbol may be a next OFDM symbol of the first OFDM symbol. For example, the first OFDM symbol is an OFDM symbol #11, and the second OFDM symbol is an OFDM symbol #12. A position relationship between the first OFDM symbol and the second OFDM symbol is not limited in this embodiment of this application.

It should be noted that a position of the first OFDM symbol is an optimal position for channel estimation. Therefore, when the first OFDM symbol is not used to carry a CRS, the first OFDM symbol is used to carry a DMRS. However, when the first OFDM symbol is used to carry the CRS, the first OFDM symbol is not used to carry the DMRS to avoid a conflict between the CRS and the DMRS. In this case, the DMRS is migrated from the first OFDM symbol to the second OFDM symbol.

Optionally, the first OFDM symbol and the second OFDM symbol are OFDM symbols other than a start OFDM symbol of the PDSCH corresponding to the DMRS. Specifically, if a quantity of consecutive OFDM symbols occupied by the DMRS is 1, that is, the DMRS is a single-symbol DMRS, the first OFDM symbol and the second OFDM symbol are OFDM symbols other than the first OFDM symbol in a time domain resource of the PDSCH. If a quantity of consecutive OFDM symbols occupied by the DMRS is 2, that is, the DMRS is a double-symbol DMRS, the first OFDM symbol and the second OFDM symbol are OFDM symbols other than the first OFDM symbol and the second OFDM symbol in a time domain resource of the PDSCH.

Optionally, if a quantity of OFDM symbols occupied by the PDSCH corresponding to the DMRS in one slot or subframe is greater than or equal to 11, the first OFDM symbol and the second OFDM symbol are the last two OFDM symbols in the time domain resource of the PDSCH.

Optionally, the first time unit is a slot in which the PDSCH corresponding to the DMRS is located, the first OFDM symbol is the twelfth OFDM symbol in the first time unit, and the second OFDM symbol is the thirteenth OFDM symbol in the first time unit. In this case, a value rule of $l_1$ in Table 1 is redefined in this embodiment of this application. That is, if the OFDM symbols occupied by the channel measurement reference signals and indicated by the N pieces of channel measurement reference signal configuration information include the twelfth OFDM symbol in the first time unit, $l_1=12$; or if the OFDM symbols occupied by the channel measurement reference signals and indicated by the N pieces of channel measurement reference signal configuration information do not include the twelfth OFDM symbol in the first time unit, $l_1=11$.

Optionally, the first time unit is a slot in which the PDSCH corresponding to the DMRS is located, the first OFDM symbol is the eighth OFDM symbol in the first time unit, and the second OFDM symbol is the ninth OFDM symbol in the first time unit, or the second OFDM symbol is the seventh OFDM symbol in the first time unit.

The foregoing rule 1 and rule 2 are applicable to various DMRS configurations. For example, a quantity of additional DMRSs may be any one of 1 to 4.

It may be understood that, when there is no contradiction, the foregoing rule 1 and rule 2 may be implemented separately or together. This is not limited in this application.

It may be understood that, when the communication apparatus is a TRP, after the TRP determines the OFDM symbol occupied by the DMRS in the first time unit, the TRP may transmit the PDSCH in the first time unit, and send the DMRS on the OFDM symbol occupied by the DMRS in the first time unit.

It may be understood that, when the communication apparatus is a terminal, after the terminal determines the OFDM symbol occupied by the DMRS in the first time unit, the terminal may receive the DMRS on the OFDM symbol occupied by the DMRS in the first time unit.

Based on the technical solution shown in FIG. 9, for any one of the plurality of TRPs participating in coordinated transmission, an OFDM symbol occupied by a DMRS of the TRP in the first time unit is determined based on the N pieces of channel measurement reference signal configuration information, instead of being determined based only on channel measurement reference signal configuration information of the TRP. In other words, for an OFDM symbol occupied by a DMRS of a TRP, impact of channel measurement reference signal configuration information of another TRP is considered, to ensure that the OFDM symbol occupied by the DMRS of the TRP is the same as an OFDM symbol occupied by a DMRS of the another TRP, and performance of DMRS-based channel estimation of the terminal is ensured.

In this embodiment of this application, one or more pieces of channel measurement reference signal configuration information in the N pieces of channel measurement reference signal configuration information are associated with a control resource set, the control resource set is used to carry DCI, and the DCI is used to schedule the PDSCH corresponding to the DMRS; and/or the one or more pieces of channel measurement reference signal configuration information in the N pieces of channel measurement reference signal configuration information are associated with a CDM group occupied by the DMRS.

It should be noted that, that the channel measurement reference signal configuration information is associated with the control resource set means that there is an association relationship between the channel measurement reference signal configuration information and the control resource set. Based on the association relationship between the channel measurement reference signal configuration information and the control resource set, a base station or the terminal can determine a control resource set associated with a piece of channel measurement reference signal configuration information, or the base station or the terminal can determine channel measurement reference signal configuration information associated with a control resource set.

The association relationship between the channel measurement reference signal configuration information and the control resource set may also be referred to as a correspondence between the channel measurement reference signal configuration information and the control resource set, for example, a one-to-one correspondence, a one-to-many correspondence, or a many-to-one correspondence between the channel measurement reference signal configuration information and the control resource set. This is not limited in this embodiment of this application.

Optionally, based on the association relationship between the channel measurement reference signal configuration information and the control resource set, for a control resource set, the terminal determines, based on channel measurement reference signal configuration information associated with the control resource set, whether to detect the DCI on the control resource set. Specifically, if a position of an RE occupied by a control resource set overlaps a position of an RE occupied by a channel measurement reference signal and indicated by channel measurement reference signal configuration information associated with the control resource set, the terminal does not detect the DCI on the control resource set. Otherwise, the terminal detects the DCI on the control resource set.

Optionally, based on the association relationship between the channel measurement reference signal configuration information and the control resource set, for a control resource set, the base station determines a resource configuration of the control resource set based on channel measurement reference signal configuration information associated with the control resource set, where the resource configuration includes a configuration of a time-frequency resource. Specifically, the base station determines that a position of an RE occupied by a control resource set does not overlap a position of an RE occupied by a channel measurement reference signal and indicated by channel measurement reference signal configuration information associated with the control resource set.

Optionally, based on the association relationship between the channel measurement reference signal configuration information and the control resource set, for a control resource set, the base station or the terminal can determine, based on channel measurement reference signal configuration information associated with the control resource set, an RE to which a target PDSCH is mapped, where the target PDSCH is a PDSCH scheduled by using DCI carried on the control resource set. Specifically, the target PDSCH is not mapped to an RE occupied by a channel measurement reference signal and indicated by the channel measurement reference signal configuration information associated with the control resource set. In other words, the base station does not send the target PDSCH on the RE occupied by the channel measurement reference signal and indicated by the channel measurement reference signal configuration information associated with the control resource set. The terminal does not receive the PDSCH on the RE occupied by the channel measurement reference signal and indicated by the channel measurement reference signal configuration information associated with the control resource set.

It should be noted that, that the channel measurement reference signal configuration information is associated with the CDM group means that there is an association relationship between the channel measurement reference signal configuration information and the CDM group. Based on the association relationship between the channel measurement reference signal and the CDM group, the base station or the terminal can determine a CDM group associated with a piece of channel measurement reference signal configuration information, or the base station or the terminal can determine channel measurement reference signal configuration information associated with a CDM group.

An association relationship between the channel measurement reference signal configuration information and the CDM group may also be referred to as a correspondence between the channel measurement reference signal configuration information and the CDM group, for example, a one-to-one correspondence, a one-to-many correspondence, or a many-to-one correspondence between the channel measurement reference signal configuration information and the CDM group. This is not limited in this embodiment of this application.

Optionally, based on the association relationship between the channel measurement reference signal configuration information and the CDM group, for a CDM group, the base station or the terminal can determine, based on channel measurement reference signal configuration information associated with the CDM group, an RE to which a PDSCH corresponding to the CDM group is mapped, where the PDSCH corresponding to the CDM group is a PDSCH corresponding to a DMRS occupying the CDM group. Specifically, the PDSCH corresponding to the CDM group is not mapped to an RE occupied by a channel measurement reference signal and indicated by the channel measurement reference signal configuration information associated with the CDM group. In other words, the base station does not send, on the RE occupied by the channel measurement reference signal and indicated by the channel measurement reference signal configuration information associated with the CDM group, the PDSCH corresponding to the CDM group. The terminal does not receive, on the RE occupied by the channel measurement reference signal and indicated by the channel measurement reference signal configuration information associated with the CDM group, the PDSCH corresponding to the CDM group.

The channel measurement reference signal configuration information may include an identifier/index value of the control resource set, to indicate the control resource set associated with the channel measurement reference signal configuration information; and/or the channel measurement reference signal configuration information may include an identifier/index value of the CDM group, to indicate the CDM group associated with the channel measurement reference signal configuration information.

Alternatively, a network device may send indication information to the terminal, to indicate the control resource set associated with the channel measurement reference signal configuration information and/or the CDM group associated with the channel measurement reference signal configuration information.

In this embodiment of this application, a resource occupied by a channel measurement reference signal and indicated by the one or more pieces of channel measurement reference signal configuration information includes a plurality of REs. It may be understood that one RE occupies one OFDM symbol in time domain, and occupies one subcarrier in frequency domain.

Optionally, the PDSCH corresponding to the DMRS is not mapped to the REs occupied by the channel measurement reference signal and indicated by the one or more pieces of channel measurement reference signal configuration information, to avoid mutual interference between the PDSCH corresponding to the DMRS and the CRS.

Optionally, a position of an RE occupied by the control resource set does not overlap positions of the REs occupied by the channel measurement reference signal and indicated by the one or more pieces of channel measurement reference signal configuration information.

The position of the RE occupied by the control resource set is specifically a position of an RE that needs to be monitored when the terminal monitors the control resource set.

In this embodiment of this application, if a position of an RE occupied by a control resource set overlaps positions of REs occupied by a channel measurement reference signal and indicated by one or more pieces of channel measurement reference signal configuration information associated with the control resource set, the terminal does not monitor the control resource set.

In this embodiment of this application, the PDSCH corresponding to the DMRS is not mapped to an RE occupied by a channel measurement reference signal and indicated by channel measurement reference signal configuration information in a first subset; and/or the position of the RE occupied by the control resource set does not overlap a position of an RE occupied by a channel measurement reference signal and indicated by channel measurement reference signal configuration information in a second subset. The first subset includes one or more pieces of channel measurement reference signal configuration information in the N pieces of channel measurement reference signal configuration information. The second subset includes one or more pieces of channel measurement reference signal configuration information in the N pieces of channel measurement reference signal configuration information. It may be understood that the first subset and the second subset may be the same or different.

The following describes the embodiment shown in FIG. 9 with reference to a scenario in which two TRPs perform cooperative transmission.

Figure 10:
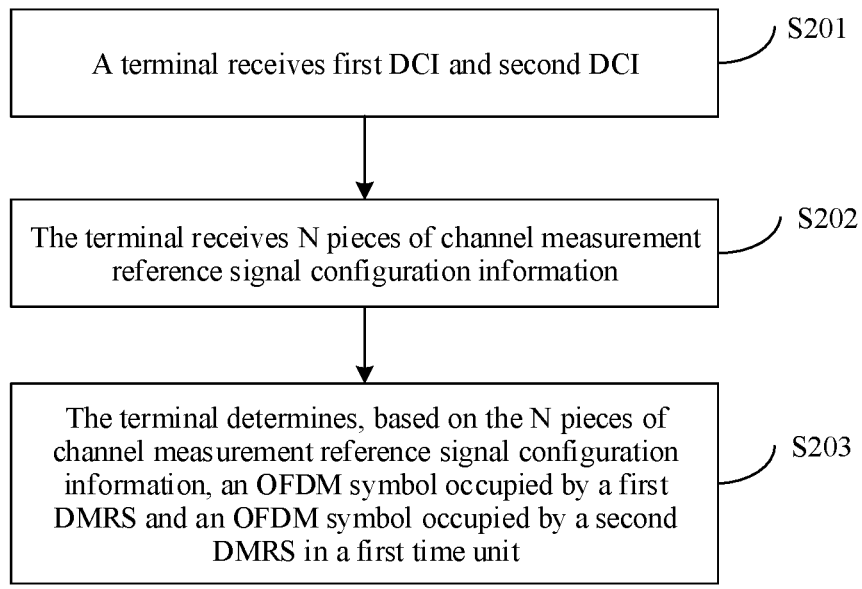
FIG. 10 is a flowchart of a resource determining method according to an embodiment of this application.

FIG. 10 shows another resource determining method according to an embodiment of this application. The method includes the following steps.

S201: A terminal receives first DCI and second DCI.

The first DCI is used to schedule a first PDSCH, and the second DCI is used to schedule a second PDSCH.

In this embodiment of this application, a PUCCH candidate resource pool corresponding to a PUCCH resource selection field in the first DCI is different from a PUCCH candidate resource pool corresponding to a PUCCH resource selection field in the second DCI.

In this embodiment of this application, the first PDSCH and the second PDSCH are located in a same BWP/CC. The first PDSCH is different from the second PDSCH. Specifically, QCL information of the first PDSCH is different from QCL information of the second PDSCH.

Optionally, a time domain resource occupied by the first PDSCH partially overlaps/completely overlaps a time domain resource occupied by the second PDSCH.

In this embodiment of this application, a DMRS on the first PDSCH is referred to as a first DMRS, and a DMRS on the second PDSCH is referred to as a second DMRS. A CDM group occupied by the first DMRS is different from a CDM group occupied by the second DMRS.

In this embodiment of this application, the first DCI is carried in a first control resource set, and the second DCI is carried in a second control resource set. The first control resource set and the second control resource set are located in a same BWP/CC. That the first control resource set is different from the second control resource set at least includes one of the following cases: (1) QCL information of the first control resource set is different from QCL information of the second control resource set. (2) A PUCCH resource set corresponding to the first control resource set is different from a PUCCH resource set corresponding to the second control resource set. (3) A PDSCH configuration parameter set corresponding to the first control resource set is different from a PDSCH configuration parameter set corresponding to the second control resource set. (4) The first control resource set and the second control resource set correspond to different candidate hybrid automatic repeat request processes.

In an implementation, the terminal may receive the first DCI and the second DCI in a same time unit. Alternatively, the terminal separately receives the first DCI and the second DCI in different time units.

Optionally, if the first DCI is used to schedule the first PDSCH in a first time unit, and the second DCI is used to schedule the second PDSCH in the first time unit, the terminal may learn that the first DCI and the second DCI come from different TRPs.

Optionally, if the first control resource set and the second control resource set belong to two different control resource set groups, the terminal may learn that the first DCI and the second DCI come from different TRPs.

S202: The terminal receives N pieces of channel measurement reference signal configuration information.

The N pieces of channel measurement reference signal configuration information come from different TRPs.

In a scenario in which two TRPs perform coordinated transmission, the N pieces of channel measurement reference signal configuration information may include first channel measurement reference signal configuration information and/or second channel measurement reference signal configuration information. The first channel measurement reference signal configuration information is different from the second channel measurement reference signal configuration information.

It should be noted that, for related descriptions of the channel measurement reference signal configuration information, refer to step S101.

S203: The terminal determines, based on the N pieces of channel measurement reference signal configuration information, an OFDM symbol occupied by the first DMRS and an OFDM symbol occupied by the second DMRS in the first time unit.

In this embodiment of this application, neither the first DMRS nor the second DMRS occupies OFDM symbols occupied by channel measurement reference signals and indicated by the N pieces of channel measurement reference signal configuration information. For example, when at least one of the N pieces of channel measurement reference signal configuration information indicates the twelfth OFDM symbol in a target slot, in the target slot, neither the first DMRS nor the second DMRS occupies the twelfth OFDM symbol in the target slot, but occupies the thirteenth OFDM symbol in the target slot. The target slot may be any slot in time domain. This is not limited.

The following specifically describes step S203 with reference to different cases of the N pieces of channel measurement reference signal configuration information.

(1) When the N pieces of channel measurement reference signal configuration information include only the first channel measurement reference signal configuration information, the terminal determines, based on the first channel measurement reference signal configuration information, the OFDM symbol occupied by the first DMRS and the OFDM symbol occupied by the second DMRS in the first time unit.

It should be noted that, in the first time unit, neither the first DMRS nor the second DMRS occupies an OFDM symbol occupied by a channel measurement reference signal and indicated by the first channel measurement reference signal configuration information.

(2) When the N pieces of channel measurement reference signal configuration information include only the second channel measurement reference signal configuration information, the terminal determines, based on the second channel measurement reference signal configuration information, the OFDM symbol occupied by the first DMRS and the OFDM symbol occupied by the second DMRS in the first time unit.

In other words, in the first time unit, neither the first DMRS nor the second DMRS occupies an OFDM symbol occupied by a channel measurement reference signal and indicated by the second channel measurement reference signal configuration information.

(3) When the N pieces of channel measurement reference signal configuration information include the first channel measurement reference signal configuration information and the second channel measurement reference signal configuration information, the terminal determines, based on the first channel measurement reference signal configuration information and the second channel measurement reference signal configuration information, the OFDM symbol occupied by the first DMRS and the OFDM symbol occupied by the second DMRS in the first time unit.

It should be noted that, in the first time unit, neither the first DMRS nor the second DMRS occupies an OFDM symbol occupied by a channel measurement reference signal and indicated by the first channel measurement reference signal configuration information, and neither the first DMRS nor the second DMRS occupies an OFDM symbol occupied by a channel measurement reference signal and indicated by the second channel measurement reference signal configuration information.

It may be understood that for a manner of determining the OFDM symbol occupied by the first DMRS and the OFDM symbol occupied by the second OFDM symbol, refer to step S102. Details are not described herein again.

Based on the technical solution shown in FIG. 10, in the scenario in which the two TRPs perform coordinated transmission, because the OFDM symbol occupied by the first DMRS is determined based on the N pieces of channel measurement reference signal configuration information, and the OFDM symbol occupied by the second DMRS is determined based on the N pieces of channel measurement reference signal configuration information, the OFDM symbol occupied by the first DMRS and the OFDM symbol occupied by the second DMRS are the same, that is, the first DMRS and the second DMRS are aligned in time domain, so that mutual interference between the first DMRS and data on the second PDSCH or mutual interference between the second DMRS and data on the first PDSCH is avoided.

For example, in a slot #1, a TRP #1 schedules a PDSCH #1, a TRP #2 schedules a PDSCH #2, and symbol lengths of both the PDSCH #1 and the PDSCH #2 are 13 or 14. The PDSCH #1 corresponds to a DMRS #1, and the PDSCH #2 corresponds to a DMRS #2. For either of the DMRS #1 and the DMRS #2, a quantity of additional DMRSs is 1. The terminal receives configuration information of a CRS #1 delivered by the TRP #1, and the terminal receives configuration information of a CRS #2 delivered by the TRP #2. The configuration information of the CRS #1 indicates that the CRS #1 occupies an OFDM symbol #0, an OFDM symbol #4, an OFDM symbol #7, and an OFDM symbol #11 in the slot #1. The configuration information of the CRS #2 indicates that the CRS #2 occupies an OFDM symbol #0, an OFDM symbol #4, an OFDM symbol #7, and an OFDM symbol #11 in the slot #2. In this case, an OFDM symbol occupied by the DMRS #1 is determined based on the configuration information of the CRS #1 and the configuration information of the CRS #2, and an OFDM symbol occupied by the DMRS #2 is determined based on the configuration information of the CRS #1 and the configuration information of the CRS #2. Therefore, to avoid occupying the OFDM symbols occupied by the CRS #1, both the DMRS #1 and the DMRS #2 occupy an OFDM symbol #12 in the slot #1, and neither the DMRS #1 nor the DMRS #2 occupies the OFDM symbol #11 in the slot #1. It can be learned that, compared with a conventional technology, the technical solution in this embodiment of this application can ensure that DMRSs of different TRPs are aligned in time domain when different TRPs schedule PDSCHs in a same time unit.

Optionally, one or more pieces of channel measurement reference signal configuration information in the N pieces of channel measurement reference signal configuration information are associated with the first control resource set; and/or the one or more pieces of channel measurement reference signal configuration information are associated with the CDM group occupied by the first DMRS.

An RE occupied by a channel measurement reference signal and indicated by the one or more pieces of channel measurement reference signal configuration information associated with the first control resource set may be referred to as a first RE for short. An RE occupied by a channel measurement reference signal and indicated by the one or more pieces of channel measurement reference signal configuration information associated with the CDM group occupied by the first DMRS may be referred to as a second RE for short.

Optionally, the first PDSCH is not mapped to the first RE and/or the second RE. In this way, the terminal may determine, based on a position of the first RE and/or a position of the second RE, a position of an RE for mapping the first PDSCH in a time-frequency resource of the first PDSCH.

Optionally, the first control resource set does not occupy the first RE and/or the second RE. In other words, a position of an RE occupied by the first control resource set does not overlap the position of the first RE and/or the position of the second RE. In this way, the terminal may determine, based on the position of the first RE and/or the position of the second RE, whether to detect DCI on the first control resource set. Specifically, if the position of the RE occupied by the first control resource set overlaps the position of the first RE and/or the position of the second RE, the terminal does not detect the first DCI on the first control resource set. If the position of the RE occupied by the first control resource set does not overlap the position of the first RE and/or the position of the second RE, the terminal detects the first DCI on the first control resource set.

Optionally, the one or more pieces of channel measurement reference signal configuration information in the N pieces of channel measurement reference signal configuration information are associated with the second control resource set; and/or the one or more pieces of channel measurement reference signal configuration information are associated with the CDM group occupied by the second DMRS.

An RE occupied by a channel measurement reference signal and indicated by the one or more pieces of channel measurement reference signal configuration information associated with the second control resource set may be referred to as a third RE for short. An RE occupied by a channel measurement reference signal and indicated by the one or more pieces of channel measurement reference signal configuration information associated with the CDM group occupied by the second DMRS may be referred to as a fourth RE for short.

Optionally, the second PDSCH is not mapped to the third RE and/or the fourth RE. In this way, the terminal may determine, based on a position of the third RE and/or a position of the fourth RE, a position of an RE for mapping the second PDSCH in a time-frequency resource of the second PDSCH.

Optionally, the second control resource set does not occupy the third RE and/or the fourth RE. In other words, a position of an RE occupied by the second control resource set does not overlap the position of the third RE and/or the position of the fourth RE. In this way, the terminal may determine, based on the position of the third RE and/or the position of the fourth RE, whether to detect the DCI on the second control resource set. Specifically, if the position of the RE occupied by the second control resource set overlaps the position of the third RE and/or the position of the fourth RE, the terminal does not detect the second DCI on the second control resource set. If the position of the RE occupied by the second control resource set does not overlap the position of the third RE and/or the position of the fourth RE, the terminal detects the second DCI on the second control resource set.

In this embodiment of this application, the one or more pieces of channel measurement reference signal configuration information associated with the first control resource set are different from the one or more pieces of channel measurement reference signal configuration information associated with the second control resource set. Alternatively, the one or more pieces of channel measurement reference signal configuration information associated with the first control resource set are the same as the one or more pieces of channel measurement reference signal configuration information associated with the second control resource set.

In this embodiment of this application, the one or more pieces of channel measurement reference signal configuration information associated with the CDM group occupied by the first DMRS are different from the one or more pieces of channel measurement reference signal configuration information associated with the CDM group occupied by the second DMRS. The one or more pieces of channel measurement reference signal configuration information associated with the CDM group occupied by the first DMRS are the same as the one or more pieces of channel measurement reference signal configuration information associated with the CDM group occupied by the second DMRS.

The foregoing mainly describes the solutions provided in the embodiments of this application from a perspective of interaction between network elements. It may be understood that, to implement the foregoing functions, each of network elements such as the terminal and the network device includes a corresponding hardware structure and/or software module for performing each function. A person skilled in the art should be easily aware that, in combination with units and algorithm steps of the examples described in the embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules of the terminal and the network device may be obtained through division based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into the modules is an example, and is merely logical function division. Another division manner may be used during actual implementation. An example in which each function module is obtained through division based on each corresponding function is used below for description.

Figure 11:
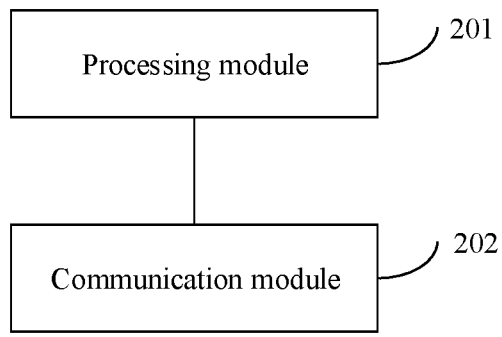
FIG. 11 is a schematic diagram of a structure of a communication apparatus according to an embodiment of this application.

FIG. 11 is a schematic diagram of a structure of a communication apparatus according to an embodiment of this application. As shown in FIG. 11, the communication apparatus includes a processing module 201 and a communication module 202. The processing module 201 is configured to support the communication apparatus in performing step S102 in FIG. 9 and step S203 in FIG. 10, and/or is configured to support another process of the technical solutions described in this specification. The communication module 202 is configured to support the communication apparatus in performing step S101 in FIG. 9 and steps S201 and S202 in FIG. 10, and/or is configured to support another process of the technical solutions described in this specification.

In an example, with reference to the communication apparatus shown in FIG. 8, the communication module 202 in FIG. 11 may be implemented by using the communication interface 104 in FIG. 8, and the processing module 201 in FIG. 11 may be implemented by using the processor 101 in FIG. 8. This is not limited in this embodiment of this application.

Figure 12:
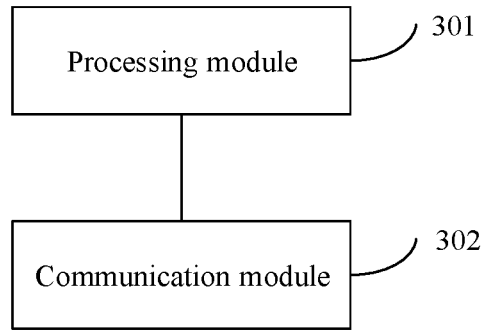
FIG. 12 is a schematic diagram of a structure of a communication apparatus according to an embodiment of this application.

FIG. 12 is a schematic diagram of a structure of a communication apparatus according to an embodiment of this application. As shown in FIG. 12, the communication apparatus includes a processing module 301 and a communication module 302. The processing module 301 is configured to support the communication apparatus in performing step S202 in FIG. 10, and/or is configured to support another process of the technical solutions described in this specification. The communication module 302 is configured to support the communication apparatus in performing step S201 in FIG. 10, and/or is configured to support another process of the technical solutions described in this specification.

In an example, with reference to the communication apparatus shown in FIG. 8, the communication module 302 in FIG. 12 may be implemented by using the communication interface 104 in FIG. 8, and the processing module 301 in FIG. 12 may be implemented by using the processor 101 in FIG. 8. This is not limited in this embodiment of this application.

An embodiment of this application further provides a computer-readable storage medium. The computer-readable storage medium stores computer instructions. When the computer-readable storage medium runs on a communication apparatus, the communication apparatus is enabled to perform the methods shown in FIG. 9 and FIG. 10. The computer instructions may be stored in the computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive (SSD)), or the like.

An embodiment of this application further provides a computer program product including computer instructions. When the computer program product runs on a communication apparatus, the communication apparatus is enabled to perform the methods shown in FIG. 9 and FIG. 10.

Figure 13:
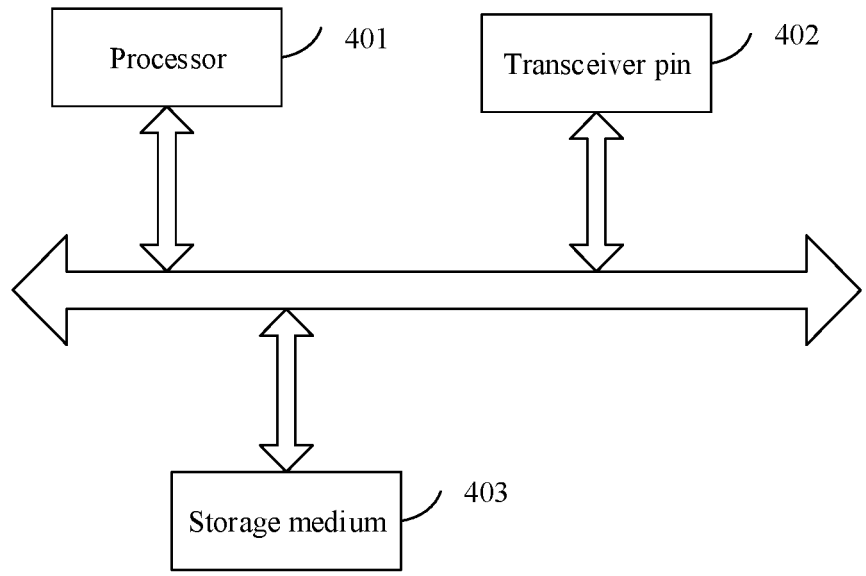
FIG. 13 is a schematic diagram of a structure of a chip according to an embodiment of this application.

FIG. 13 is a schematic diagram of a structure of a chip according to an embodiment of this application. The chip shown in FIG. 13 may be a general-purpose processor, or may be a dedicated processor. The chip includes a processor 401. The processor 401 is configured to support a communication apparatus in performing the technical solutions shown in FIG. 9 and FIG. 10.

Optionally, the chip further includes a transceiver pin 402. The transceiver pin 402 is configured to support the communication apparatus in performing the technical solutions shown in FIG. 9 and FIG. 10 under control of the processor 401.

Optionally, the chip shown in FIG. 13 may further include a storage medium 403.

It should be noted that the chip shown in FIG. 13 may be implemented by using the following circuit or component: one or more field programmable gate arrays (FPGAs), a programmable logic device (PLD), a controller, a state machine, gate logic, a discrete hardware component, any other appropriate circuit, or any combination of circuits that can perform various functions described in this application.

The terminal, the network device, the computer storage medium, the computer program product, and the chip provided in the embodiments of this application are all configured to perform the methods provided above. Therefore, for beneficial effects that can be achieved by the terminal, the network device, the computer storage medium, the computer program product, and the chip, refer to the beneficial effects corresponding to the methods provided above. Details are not described herein again.

Although this application is described with reference to the embodiments herein, a person skilled in the art may understand and implement another variation of the disclosed embodiments by viewing the accompanying drawings, disclosed content, and the appended claims. In the claims, "comprising" does not exclude another component or another step, and "a" or "one" does not exclude a meaning of plurality. A single processor or another unit may implement several functions enumerated in the claims. Some measures are recorded in dependent claims that are different from each other, but this does not mean that the measures cannot be combined to produce a good effect.

Although this application is described with reference to specific features and the embodiments thereof, obviously, various modifications and combinations may be made to them without departing from the spirit and scope of this application. Correspondingly, the specification and accompanying drawings are merely descriptions of examples of this application defined by the appended claims, and are considered as any of or all modifications, variations, combinations, or equivalents that cover the scope of this application. Obviously, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A resource determining method, comprising:
receiving, by a terminal from one or more of transmission reception points (TRPs) in a coordinated multipoint transmission/reception (COMP) scenario, N pieces of channel measurement reference signal configuration information, wherein each of the N pieces of channel measurement reference signal configuration information is used to indicate a resource occupied by a channel measurement reference signal on one carrier, serving cell, or bandwidth part, the resource occupied by the channel measurement reference signal comprises a time domain resource, and N is a positive integer; and
determining, by the terminal based on the N pieces of channel measurement reference signal configuration information, an orthogonal frequency division multiplexing (OFDM) symbol occupied by a demodulation reference signal (DMRS) in a first time unit.

2. The resource determining method according to claim 1, wherein the time domain resource includes an OFDM symbol, and an OFDM symbol occupied by the DMRS does not overlap an OFDM symbol occupied by channel measurement reference signals indicated by the N pieces of channel measurement reference signal configuration information.

3. The resource determining method according to claim 1, wherein if an OFDM symbol occupied by a channel measurement reference signal indicated by at least one of the N pieces of channel measurement reference signal configuration information comprises a first OFDM symbol, the OFDM symbol occupied by the DMRS does not comprise the first OFDM symbol, or the OFDM symbol occupied by the DMRS comprises a second OFDM symbol.

4. The resource determining method according to claim 3, wherein the first OFDM symbol and the second OFDM symbol are OFDM symbols other than a start OFDM symbol of a physical downlink shared channel (PDSCH) corresponding to the DMRS.

5. The resource determining method according to claim 4, wherein the first time unit is a slot in which the PDSCH corresponding to the DMRS is located, the first OFDM symbol is the twelfth OFDM symbol in the slot, and the second OFDM symbol is the thirteenth OFDM symbol in the slot.

6. The resource determining method according to claim 1, wherein if OFDM symbols occupied by the channel measurement reference signals indicated by the N pieces of channel measurement reference signal configuration information do not comprise a first OFDM symbol, the OFDM symbol occupied by the DMRS comprises the first OFDM symbol, and the OFDM symbol occupied by the DMRS does not comprise a second OFDM symbol.

7. The resource determining method according to claim 1, wherein at least one of:
one or more pieces of channel measurement reference signal configuration information in the N pieces of channel measurement reference signal configuration information are associated with a control resource set, the control resource set is used to carry downlink control information (DCI), and the DCI is used to schedule a physical downlink shared channel (PDSCH) corresponding to the DMRS; or one or more pieces of channel measurement reference signal configuration information in the N pieces of channel measurement reference signal configuration information are associated with a code division multiplexing (CDM) group occupied by the DMRS.

8. A resource determining method, comprising:
obtaining, by a network device, N pieces of channel measurement reference signal configuration information for one or more of transmission reception points (TRPs) in a coordinated multipoint transmission/reception (COMP) scenario, wherein each of the N pieces of channel measurement reference signal configuration information is used to indicate a resource occupied by a channel measurement reference signal on one carrier, serving cell, or bandwidth part, the resource occupied by the channel measurement reference signal comprises a time domain resource, and N is a positive integer; and determining, by the network device based on the N pieces of channel measurement reference signal configuration information, an orthogonal frequency division multiplexing (OFDM) symbol occupied by a demodulation reference signal (DMRS) in a first time unit.

9. The resource determining method according to claim 8, wherein the time domain resource includes an OFDM symbol, and an OFDM symbol occupied by the DMRS does not overlap an OFDM symbol occupied by channel measurement reference signals indicated by the N pieces of channel measurement reference signal configuration information.

10. The resource determining method according to claim 8, wherein if an OFDM symbol occupied by a channel measurement reference signal and indicated by at least one of the N pieces of channel measurement reference signal configuration information comprises a first OFDM symbol, the OFDM symbol occupied by the DMRS does not comprise the first OFDM symbol, or the OFDM symbol occupied by the DMRS comprises a second OFDM symbol.

11. The resource determining method according to claim 10, wherein the first OFDM symbol and the second OFDM symbol are OFDM symbols other than a start OFDM symbol of a physical downlink shared channel (PDSCH) corresponding to the DMRS.

12. The resource determining method according to claim 11, wherein the first time unit is a slot in which the PDSCH corresponding to the DMRS is located, the first OFDM symbol is the twelfth OFDM symbol in the slot, and the second OFDM symbol is the thirteenth OFDM symbol in the slot.

13. The resource determining method according to claim 8, wherein if OFDM symbols occupied by the channel measurement reference signals indicated by the N pieces of channel measurement reference signal configuration information do not comprise a first OFDM symbol, the OFDM symbol occupied by the DMRS comprises the first OFDM symbol, and the OFDM symbol occupied by the DMRS does not comprise a second OFDM symbol.

14. A communication apparatus, comprising:
a transceiver, the transceiver configured to receive N pieces of channel measurement reference signal configuration information from one or more of transmission reception points (TRPs) in a coordinated multipoint transmission/reception (COMP) scenario, wherein each of the N pieces of channel measurement reference signal configuration information is used to indicate a resource occupied by a channel measurement reference signal on one carrier, serving cell, or bandwidth part, the resource occupied by the channel measurement reference signal comprises a time domain resource, and N is a positive integer;

at least one processor; and one or more memories coupled to the at least one processor and storing programming instructions for execution by the at least one processor to determine, based on the N pieces of channel measurement reference signal configuration information, an orthogonal frequency division multiplexing (OFDM) symbol occupied by a demodulation reference signal (DMRS) in a first time unit.

15. The communication apparatus according to claim 14, wherein the time domain resource includes an OFDM symbol, and an OFDM symbol occupied by the DMRS does not overlap an OFDM symbol occupied by channel measurement reference signals indicated by the N pieces of channel measurement reference signal configuration information.

16. The communication apparatus according to claim 14, wherein if an OFDM symbol occupied by a channel measurement reference signal indicated by at least one of the N pieces of channel measurement reference signal configuration information comprises a first OFDM symbol, the OFDM symbol occupied by the DMRS does not comprise the first OFDM symbol, or the OFDM symbol occupied by the DMRS comprises a second OFDM symbol.

17. The communication apparatus according to claim 16, wherein the first OFDM symbol and the second OFDM symbol are OFDM symbols other than a start OFDM symbol of a physical downlink shared channel (PDSCH) corresponding to the DMRS.

18. The communication apparatus according to claim 17, wherein the first time unit is a slot in which the PDSCH corresponding to the DMRS is located, the first OFDM symbol is the twelfth OFDM symbol in the slot, and the second OFDM symbol is the thirteenth OFDM symbol in the slot.

19. The communication apparatus according to claim 14, wherein if OFDM symbols occupied by the channel measurement reference signals indicated by the N pieces of channel measurement reference signal configuration information do not comprise a first OFDM symbol, the OFDM symbol occupied by the DMRS comprises the first OFDM symbol, and the OFDM symbol occupied by the DMRS does not comprise a second OFDM symbol.

20. The communication apparatus according to claim 14, wherein at least one of:
one or more pieces of channel measurement reference signal configuration information in the N pieces of channel measurement reference signal configuration information are associated with a control resource set, the control resource set is used to carry downlink control information (DCI), and the DCI is used to schedule a physical downlink shared channel (PDSCH) corresponding to the DMRS; or one or more pieces of channel measurement reference signal configuration information in the N pieces of channel measurement reference signal configuration information are associated with a code division multiplexing (CDM) group occupied by the DMRS.

* * * * *